(12) United States Patent
Lei et al.

(10) Patent No.: US 11,917,054 B2
(45) Date of Patent: *Feb. 27, 2024

(54) NETWORK KEY PROCESSING METHOD AND SYSTEM AND RELATED DEVICE

(71) Applicant: Huawei Technologies Co., Ltd., Guangdong (CN)

(72) Inventors: Zhongding Lei, Singapore (SG); Lichun Li, Shenzhen (CN); Bo Zhang, Shenzhen (CN); Fei Liu, Singapore (SG); Haiguang Wang, Singapore (SG); Xin Kang, Singapore (SG)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/819,188

(22) Filed: Aug. 11, 2022

(65) Prior Publication Data

US 2023/0033598 A1 Feb. 2, 2023

Related U.S. Application Data

(63) Continuation of application No. 16/517,645, filed on Jul. 21, 2019, now Pat. No. 11,431,479, which is a continuation of application No. PCT/CN2017/102864, filed on Sep. 22, 2017.

(30) Foreign Application Priority Data

Jan. 25, 2017 (CN) .......................... 201710064224.2

(51) Int. Cl.
*H04L 9/08* (2006.01)
*H04L 9/14* (2006.01)
*H04L 9/40* (2022.01)

(52) U.S. Cl.
CPC ............ *H04L 9/0819* (2013.01); *H04L 9/085* (2013.01); *H04L 9/14* (2013.01); *H04L 63/0428* (2013.01)

(58) Field of Classification Search
CPC ... H04W 12/06; H04W 12/08; H04W 12/084; H04W 48/08; H04W 48/16; H04W 12/037; H04L 9/0819; H04L 9/14
See application file for complete search history.

(56) References Cited

U.S. PATENT DOCUMENTS

2013/0290703 A1* 10/2013 Resch .................. G06F 3/0619
713/155
2017/0303259 A1 10/2017 Lee et al.
(Continued)

FOREIGN PATENT DOCUMENTS

| CN | 103516789 A | 1/2014 |
| CN | 104735654 A | 6/2015 |
| CN | 106210042 A | 12/2016 |

OTHER PUBLICATIONS

3GPP TR 23.799 V14.0.0 (Dec. 2016);3rd Generation Partnership Project; Technical Specification Group Services and System Aspects; Study on Architecture for Next Generation System(Release 14);total 522 pages.

(Continued)

*Primary Examiner* — Olugbenga O Idowu
(74) *Attorney, Agent, or Firm* — WOMBLE BOND DICKINSON (US) LLP

(57) ABSTRACT

Embodiments of this application disclose a network key processing system, including user equipment, a security anchor network element, and an access and mobility management network element, where the security anchor network element is configured to: obtain a first key parameter from a slice selection network element, where the first key parameter includes identifier information of N network (Continued)

slices; generate N slice-dedicated keys based on the first key parameter; and send the N slice-dedicated keys to the corresponding N network slices respectively; the access and mobility management network element is configured to: obtain the first key parameter, and send the first key parameter to the user equipment; and the user equipment is configured to: generate the N slice-dedicated keys for the N network slices based on the first key parameter, and access the N network slices based on the generated N slice-dedicated keys.

28 Claims, 24 Drawing Sheets

(56) References Cited

U.S. PATENT DOCUMENTS

| | | | |
|---|---|---|---|
| 2018/0084427 A1* | 3/2018 | Huo | ........................ H04W 12/041 |
| 2018/0270744 A1 | 9/2018 | Griot et al. | |
| 2020/0145818 A1 | 5/2020 | Lee et al. | |

OTHER PUBLICATIONS

3GPP TR 33.899 V0.6.0 (Nov. 2016);3rd Generation Partnership Project; Technical Specification Group Services and System Aspects; Study on the security aspects of the next generation system(Release 14);total 375 pages.

NEC, "pCR to TR 33.899: Solution #1.8 Updated Key hierarchy for NextGen" ,3GPP TSG SA WG3 (Security) Meeting #85S3-162141(rev of S3-161980),Nov. 7-11, 2016, Santa Cruz de Tenerife, Spain, total 4 pages.

ZTE, "Key hierarchy schems for network slicing" ,3GPP TSG SA WG3 (Security) Meeting #84 S3-160965,Jul. 25-29, 2016 Chennai (India), total 6 pages.

Huawei et al., "Call flow for slice-specific NAS key derivation and distribution" , 3GPP TSG SA WG3 (Security) Meeting #86 S3-170058,Feb. 6-10, 2017, Sophia Antipolis (France), total 2 pages.

Huawei, "Add concept for network slice instance identifier" ,3GPP TSG SA WG5 (Telecom Management) Meeting #111 S5-171127,Jan. 16-20, 2017, Porto (Portugal), total 4 pages.

* cited by examiner

US 11,917,054 B2

NETWORK KEY PROCESSING METHOD AND SYSTEM AND RELATED DEVICE

CROSS-REFERENCE TO RELATED APPLICATIONS

This application is a continuation of U.S. patent application Ser. No. 16/517,645, filed on Jul. 21, 2019, which is a continuation of International Application No. PCT/CN2017/102864, filed on Sep. 22, 2017, which claims priority to Chinese Patent Application No. 201710064224.2, filed on Jan. 25, 2017. All of the afore-mentioned patent applications are hereby incorporated by reference in their entireties.

TECHNICAL FIELD

This application relates to the field of network security technologies in a mobile communications network, and in particular, to a network key processing method and system and a related device.

BACKGROUND

An existing mobile communications network (such as 3G or LTE) mainly provides three-level security: two-way authentication between a terminal and a network, non-access stratum (NAS) security, and access stratum (AS) security. The terminal and the network first determine authenticity of identities of each other through the two-way authentication, and generate a root key (K_ASME) that can be used to set up the NAS security and the AS security. Located at a highest layer of a control plane in a 3GPP EPS (evolved packet system) protocol stack, a NAS layer is used to transfer radio access—unrelated signaling between the terminal and a core network, and mainly includes signaling protocols and procedures that are used for mobility management (MM) and session management (SM). An AS layer is mainly a radio access protocol stack used for interaction between the terminal and a base station. Keys required for the NAS security and the AS security are all derived from the K_ASME.

In a 3GPP next-generation wireless communications network architecture, an architecture of a network slice is introduced. As a virtualized logical dedicated network, the network slice may be customized based on different service requirements. To better support network slice customization, an existing network element needs to be first refined. A functional network element of a mobility management entity (MME) in an existing LTE core network is refined into a plurality of functions in a next-generation network. For example, in the 3 GPP SA2 TR 23.799 V14.0.0 (2016-12) technical report, functions of the MME are decomposed into network functions such as an access and mobility management function (AMF), a security anchor function (SEAF), and a session management function (SMF).

When a terminal accesses a network, the network selects one or more slices for the terminal according to some methods. When the terminal simultaneously accesses a plurality of slices, all signaling interaction between the terminal and the slices is performed by using an AMF. The AMF is an encryption and decryption termination point for NAS signaling and is a shared function for a plurality of slices. The foregoing indicates that the AMF is an intersection when the terminal simultaneously accesses the plurality of slices. This limitation is resulted from consideration for mobility of the terminal and complexity of a network architecture. Regardless of a quantity of slices accessed by the terminal, the mobility of the terminal is consistent or unique; and if one user equipment (UE) is allowed to simultaneously access a plurality of AMFs, quantities of connections and interfaces between network functions or between network elements, and complexity are significantly increased.

When a slice exchanges NAS signaling with the terminal, for example, a slice 1 (or a slice 2) sends NAS information to the terminal, the NAS information is unencrypted plaintext for the AMF. When an attacker intrudes into the AMF, the attacker can easily obtain information sent by an SMF, and therefore, the NAS information of the slice is easily leaked.

SUMMARY

Embodiments of this application provide a network key processing method and system and a related device, to improve security of network signaling interaction.

A first aspect of this application discloses a network key processing system, including user equipment, a security anchor network element, and an access and mobility management network element.

The security anchor network element is configured to: obtain a first key parameter from a slice selection network element, where the first key parameter includes identifier information of N network slices, and the N network slices are network slices determined by the slice selection network element for the user equipment; and generate N slice-dedicated keys based on the first key parameter, where N is an integer greater than or equal to 1. The N network slices are one or more network slices selected by a core network for the user equipment when the user equipment performs two-way authentication with the core network. Alternatively, the user equipment first sends, to a core network, an identifier of a network slice that the user equipment needs to access, and then a network element in the core network, for example, a network element with a slice selection function, determines the corresponding network slice based on the identifier of the network slice sent by the user equipment. In addition, the network element with the slice selection function may first determine whether the network slice corresponding to the identifier can be allocated to the user equipment. If the network slice corresponding to the identifier can be allocated to the user equipment, the network element with the slice selection function allocates the network slice to the user equipment; or if the network slice corresponding to the identifier cannot be allocated to the user equipment, the network element with the slice selection function does not allocate the network slice to the user equipment.

The security anchor network element is further configured to send the N slice-dedicated keys to the corresponding N network slices respectively. The security anchor network element may send the generated N dedicated keys to the corresponding N network slices respectively based on the identifier information of the N network slices, so that each network slice receives a dedicated key corresponding to an identifier of the network slice. If a network slice successfully receives a dedicated key, the network slice may send acknowledgement information indicating successful reception to the security anchor network element.

The access and mobility management network element is configured to: obtain the first key parameter from the slice selection network element or the security anchor network element, and send the first key parameter to the user equipment. The first key parameter includes the identifier information of the N network slices. Because both the slice selection network element and the security anchor network element in the core network have obtained the identifier information, the security anchor may send the identifier information to the access and mobility management network element, or the slice selection network element may send the identifier information to the access and mobility management network element.

The user equipment is configured to: generate the N slice-dedicated keys for the N network slices based on the first key parameter, and access the N network slices based on the generated N slice-dedicated keys. The user equipment and the security anchor network element pre-agree to use a same key generation rule to generate a dedicated key. When both the user equipment and the security anchor network element use the same first key parameter to generate the dedicated keys, the N slice-dedicated keys generated by the user equipment are the same as the N slice-dedicated keys generated by the security anchor network element, so that the user equipment can sequentially access the N network slices based on the N slice-dedicated keys. In this way, in this application, different dedicated keys are set for different network slices, and the user equipment can generate the same dedicated keys for the network slices, so that the user equipment can perform signaling interaction with the network slices, and security risks are reduced during signaling interaction performed by using a shared key.

In an implementation, the security anchor network element is further configured to: generate a shared key for the access and mobility management network element based on a second key parameter, and send the second key parameter to the access and mobility management network element, where the shared key is used for a shared network function of the N network slices;

the access and mobility management network element is further configured to receive the second key parameter sent by the security anchor network element; and the user equipment is further configured to: receive the second key parameter from the access and mobility management network element, and then generate the same shared key, so that the user equipment can access the shared network function of the N network slices. In actual application, different network slices may also have a same network function. For example, some common basic functions are usually set as shared network functions, and each user equipment usually has functions of this type when performing accessing. Therefore, these network functions do not need to be set in a network slice and specially protected by the network slice, and a shared key may be set for signaling interaction between the network slices and all authorized user equipments.

In another implementation, the access and mobility management network element is further configured to:

before sending the first key parameter to the user equipment, encrypt the first key parameter by using the shared key;

the access and mobility management network element is configured to:

send, by the access and mobility management network element, the encrypted first key parameter to the user equipment by using a slice security mode command; and the user equipment is configured to receive the encrypted first key parameter sent by the access and mobility management network element by using the slice security mode command.

A data packet may be intercepted in a process in which the access and mobility management network element sends the first key parameter to the user equipment, and consequently, an attacker obtains content information of the first key parameter in the data packet. Because the first key parameter includes identifier information of a network slice to be accessed by the user equipment, the attacker learns of a type of the network slice to be accessed by the user equipment, personal information of the user equipment may be leaked, and the attacker may even directly access the corresponding network slice by using the first key parameter and perform an illegal operation. Therefore, in this application, before sending the first key parameter to the user equipment, the access and mobility management network element may further encrypt the first key parameter, and may encrypt the first key parameter by using the shared key. After receiving the key parameter with the shared key, the user equipment can derive and parse content out of an encrypted data packet, thereby obtaining the first key parameter. In this way, network communication security is improved.

In another implementation, the system further includes the network slices, where the network slices are configured to receive the dedicated keys sent by the security anchor network element;

the network slices are further configured to encrypt M network functions based on an encryption parameter, where the encryption parameter includes the dedicated key and function identifiers of the M network functions;

the network slices are further configured to send the encryption parameter to the access and mobility management network element;

the access and mobility management network element is further configured to send the encryption parameter to the user equipment; and the user equipment is further configured to receive the encryption parameter, and can access the M network functions of the network slice based on the encryption parameter.

Each network slice may include a plurality of network functions, different network functions are of different importance, and a more important network function should be set by using a more complex encryption method. In this application, security of different network functions may be improved by encrypting each network function in each network slice. Network functions may use a same encryption algorithm or different encryption algorithms, and after encryption, the encryption parameter is sent to the user equipment, so that the user equipment can access the encrypted network functions based on the encryption parameter.

A second aspect of this application provides a security anchor network element, where the network element includes:

an obtaining unit, configured to obtain a first key parameter from a slice selection network element, where the first key parameter includes identifier information of N network slices, and the N network slices are network slices determined by the slice selection network element for the user equipment;

a generation unit, configured to generate N dedicated keys based on the first key parameter; and a sending unit, configured to send the N slice-dedicated keys to the corresponding N network slices respectively, so that after receiving the first key parameter from an access and mobility management network element, the user equipment generates the same N slice-dedicated keys and can access the N network slices.

In an implementation, the sending unit is further configured to:

send the first key parameter to the access and mobility management network element, so that the access and mobility management network element sends the first key parameter to the user equipment.

In another implementation, the generation unit is further configured to:

generate a shared key for the access and mobility management network element based on a second key parameter, and send the second key parameter to the access and mobility management network element, where the shared key is used for a shared network function of the N network slices, so that after receiving the second key parameter from the access and mobility management network element, the user equipment generates the same shared key and can access the shared network function of the N network slices.

A third aspect of this application provides an access and mobility management network element, where the network element includes:

an obtaining unit, configured to obtain the first key parameter from a slice selection network element or a security anchor network element, where the first key parameter includes identifier information of N network slices, the N network slices are network slices determined by the slice selection network element for the user equipment, and the first key parameter is used by the security anchor network element to generate N slice-dedicated keys and send the N slice-dedicated keys to the corresponding N network slices; and a sending unit, configured to send the first key parameter to the user equipment, so that the user equipment generates the same N slice-dedicated keys based on the first key parameter and can access the N network slices.

In an implementation, the network element further includes:

a receiving unit, configured to receive a second key parameter sent by the security anchor network element, where the second key parameter is used by the security anchor network element to generate a shared key for the access and mobility management network element, and the shared key is used for a shared network function of the N network slices; and the sending unit is further configured to send the second key parameter to the user equipment, so that the user equipment generates the same shared key based on the second key parameter and can access the shared network function of the N network slices.

In another implementation, the network element further includes:

an encryption unit, configured to: before the sending unit sends the first key parameter to the user equipment by using a slice security mode command, enable the access and mobility management network element to encrypt the first key parameter by using the shared key; and the sending unit is further configured to:

send the encrypted first key parameter to the user equipment by using the slice security mode command.

In another implementation, the receiving unit is further configured to:

before the sending unit sends the encrypted first key parameter to the user equipment by using the slice security mode command, receive encryption parameters sent by the N network slices, where the encryption parameter is a parameter used by each of the N network slices to encrypt M network functions; and the sending unit is further configured to:

send the encrypted first key parameter and the encryption parameters to the user equipment by using the slice security mode command, so that the user equipment accesses the M network functions of the N network slices based on the encryption parameters.

A fourth aspect of this application provides a network slice, where the network slice includes:

a receiving unit, configured to receive a dedicated key sent by a security anchor network element;

an encryption unit, configured to encrypt M network functions based on an encryption parameter, where the encryption parameter includes the dedicated key and function identifiers of the M network functions; and a sending unit, configured to send the encryption parameter to an access and mobility management network element, so that the access and mobility management network element sends the encryption parameter to user equipment, and then the user equipment accesses the M network functions of the network slice based on the encryption parameter.

A fifth aspect of this application provides user equipment, where the user equipment includes:

a receiving unit, configured to receive a first key parameter sent by the access and mobility management network element, where the first key parameter includes identifier information of N network slices, the N network slices are network slices determined by the slice selection network element for the user equipment, and the first key parameter is used by a security anchor network element to generate N slice-dedicated keys and send the N slice-dedicated keys to the corresponding N network slices; and a generation unit, configured to generate the same N slice-dedicated keys based on the first key parameter, so that the user equipment can access the N network slices.

In an implementation, the receiving unit is further configured to:

receive a second key parameter sent by the access and mobility management network element, where the second key parameter is used by the security anchor network element to generate a shared key for the access and mobility management network element, and the shared key is used for a shared network function of the N network slices; and the user equipment further includes:

the generation unit is configured to generate the same shared key based on the second key parameter, so that the user equipment can access the shared network function of the N network slices.

In another implementation, the receiving unit is further configured to:

receive the first key parameter that is encrypted based on the shared key and sent by the access and mobility management network element by using a slice security mode command.

In another implementation, the receiving unit is further configured to:

receive encryption parameters and the first key parameter that is encrypted based on the shared key and sent by the access and mobility management network element by using the slice security mode command, where the encryption parameter is a parameter used by each of the N network slices to encrypt M network functions; and the user equipment further includes:

an access unit, configured to access the M network functions of the N network slices based on the encryption parameters.

A sixth aspect of this application provides a network key processing method applied to a security anchor network element side, where the method includes:

obtaining, by the security anchor network element, a first key parameter from a slice selection network element, where the first key parameter includes identifier information of N network slices, and the N network slices are network slices determined by the slice selection network element for the user equipment;

generating, by the security anchor network element, N dedicated keys based on the first key parameter; and sending, by the security anchor network element, the N slice-dedicated keys to the corresponding N network slices respectively, so that after receiving the first key parameter from an access and mobility management network element, the user equipment generates the same N slice-dedicated keys and can access the N network slices.

In an implementation, the method further includes:

sending, by the security anchor network element, the first key parameter to the access and mobility management network element, so that the access and mobility management network element sends the first key parameter to the user equipment.

In another implementation, the method further includes:

generating, by the security anchor network element, a shared key for the access and mobility management network element based on a second key parameter, and sending the second key parameter to the access and mobility management network element, where the shared key is used for a shared network function of the N network slices, so that after receiving the second key parameter from the access and mobility management network element, the user equipment generates the same shared key and can access the shared network function of the N network slices.

A seventh aspect of this application provides a network key processing method applied to an access and mobility management network element side, where the method includes:

obtaining, by the access and mobility management network element, the first key parameter from a slice selection network element or a security anchor network element, where the first key parameter includes identifier information of N network slices, the N network slices are network slices selected by the slice selection network element for the user equipment, and the first key parameter is used by the security anchor network element to generate N slice-dedicated keys and send the N slice-dedicated keys to the corresponding N network slices; and sending, by the access and mobility management network element, the first key parameter to the user equipment, so that the user equipment generates the same N slice-dedicated keys based on the first key parameter and can access the N network slices.

In an implementation, the method further includes:

receiving, by the access and mobility management network element, a second key parameter sent by the security anchor network element, where the second key parameter is used by the security anchor network element to generate a shared key for the access and mobility management network element, and the shared key is used for a shared network function of the N network slices; and sending, by the access and mobility management network element, the second key parameter to the user equipment, so that the user equipment generates the same shared key based on the second key parameter and can access the shared network function of the N network slices.

In another implementation, the sending, by the access and mobility management network element, the second key parameter to the user equipment includes:

sending, by the access and mobility management network element, the second key parameter to the user equipment by using a slice security mode command.

In another implementation, before the access and mobility management network element sends the first key parameter to the user equipment by using a slice security mode command, the method further includes:

encrypting, by the access and mobility management network element, the first key parameter by using the shared key; and the sending, by the access and mobility management network element, the first key parameter to the user equipment by using a slice security mode command includes:

sending, by the access and mobility management network element, the encrypted first key parameter to the user equipment by using the slice security mode command.

In another implementation, before the sending, by the access and mobility management network element, the encrypted first key parameter to the user equipment by using the slice security mode command, the method further includes:

receiving encryption parameters sent by the N network slices, where the encryption parameter is a parameter used by each of the N network slices to encrypt M network functions; and the sending, by the access and mobility management network element, the encrypted first key parameter to the user equipment by using the slice security mode command includes:

sending, by the access and mobility management network element, the encrypted first key parameter and the encryption parameters to the user equipment by using the slice security mode command, so that the user equipment accesses the M network functions of the N network slices based on the encryption parameters.

An eighth aspect of this application provides a network key processing method applied to a network slice side, where the method includes:

receiving, by the network slice, a dedicated key sent by a security anchor network element;

encrypting, by the network slice, M network functions based on an encryption parameter, where the encryption parameter includes the dedicated key and function identifiers of the M network functions; and sending, by the network slice, the encryption parameter to an access and mobility management network element, so that the access and mobility management network element sends the encryption parameter to user equipment, and then the user equipment accesses the M network functions of the network slice based on the encryption parameter.

A ninth aspect of this application provides a network key processing method applied to a user equipment side, where the method includes:

receiving, by the user equipment, a first key parameter sent by the access and mobility management network element, where the first key parameter includes identifier information of N network slices, the N network slices are network slices determined by the slice selection network element for the user equipment, and the first key parameter is used by a security anchor network element to generate N slice-dedicated keys and send the N slice-dedicated keys to the corresponding N network slices; and generating, by the user equipment, the same N slice-dedicated keys based on the first key parameter, so that the user equipment can access the N network slices.

In an implementation, the method further includes:

receiving, by the user equipment, a second key parameter sent by the access and mobility management network element, where the second key parameter is used by the security anchor network element to generate a shared key for the access and mobility management network element, and the shared key is used for a shared network function of the N network slices; and generating, by the user equipment, the same shared key based on the second key parameter, so that the user equipment can access the shared network function of the N network slices.

In another implementation, the receiving, by the user equipment, a second key parameter sent by the access and mobility management network element includes:

receiving, by the user equipment, the second key parameter sent by the access and mobility management network element by using a slice security mode command.

In another implementation, the receiving, by the user equipment, the second key parameter sent by the access and mobility management network element by using the slice security mode command includes:

receiving, by the user equipment, the first key parameter that is encrypted based on the shared key and sent by the access and mobility management network element by using the slice security mode command.

In another implementation, the receiving, by the user equipment, the first key parameter that is encrypted based on the shared key and sent by the access and mobility management network element by using the slice security mode command includes receiving, by the user equipment, encryption parameters and the first key parameter that is encrypted based on the shared key and sent by the access and mobility management network element by using the slice security mode command, where the encryption parameter is a parameter used by each of the N network slices to encrypt M network functions; and accessing, by the user equipment, the M network functions of the N network slices based on the encryption parameters.

A tenth aspect of this application provides a security anchor device, where the security anchor device includes a transceiver, a processor, and a memory, the memory is configured to store a program and data, and the processor invokes the program stored in the memory, to perform the network key processing method according to any implementation of the sixth aspect.

An eleventh aspect of this application provides an access and mobility management device, where the access and mobility management device includes a transceiver, a processor, and a memory, the memory is configured to store a program and data, and the processor invokes the program stored in the memory, to perform the network key processing method according to any implementation of the seventh aspect.

A twelfth aspect of this application provides a network slice device, where the network slice device includes a transceiver, a processor, and a memory, the memory is configured to store a program and data, and the processor invokes the program stored in the memory, to perform the network key processing method according to any implementation of the eighth aspect.

A thirteenth aspect of this application provides user equipment, where the user equipment includes a transceiver, a processor, and a memory, the memory is configured to store a program and data, and the processor invokes the program stored in the memory, to perform the network key processing method according to any implementation of the ninth aspect.

A fourteenth aspect of this application provides a computer readable storage medium. The computer readable storage medium stores an instruction. When the instruction runs on a computer, the computer performs the methods according to the foregoing aspects.

A fifteenth aspect of this application provides a computer program product that includes an instruction. When the computer program product runs on a computer, the computer performs the methods according to the foregoing aspects.

It can be learned from the foregoing technical solutions that the embodiments of this application have the following advantages:

In this application, different dedicated keys are set for different network slices, and the user equipment can generate the same dedicated keys for the network slices, so that the user equipment can perform signaling interaction with the network slices, and security risks are reduced during signaling interaction performed by using a shared key.

DESCRIPTION OF EMBODIMENTS

Embodiments of this application provide a network key processing method and system and a related device, to improve security of network signaling interaction.

Terms used in implementations of this application are merely used to explain specific embodiments of this application, but are not intended to limit this application.

As a virtualized logical dedicated network, a network slice may be customized based on different service requirements. Operation and management modes of the network slice are diversified. A mobile network operator (MNO) may operate and manage a slice on its own, and one slice may be shared by different users. To support development of a vertical industry, one or more network slices of the MNO may be further leased to the vertical industry, and the vertical industry operates, manages, and authenticates user equipment (a mobile terminal, an IoT device, or the like). User equipment that is to access a slice first needs to use a service of the MNO to access the slice, and then the user equipment is managed by the slice. In other words, the user equipment not only needs to interact with an MNO network, but also needs to interact with a network slice.

To better support network slice customization, an existing network function is first refined. For example, in the 3GPP SA2 TR 23.799 V14.0.0 (2016-12) technical report, functions of an MME are decomposed into network functions such as an AMF, an SEAF, and an SMF. It should be noted that the network functions such as the access and mobility management function (AMF), the session management function (SMF), and the security anchor function (SEAF) in this application are names used in drafts and technical reports (TR) of 3GPP SA2 and SA3 standard working groups. These names may be further changed, for example, a name is changed, or network functions are merged or divided. This application is not limited to the names and locations (these network functions are set on or integrated into a specific network element, for example, an MMF and an SEAF are integrated into an MME in a 4G network) of these network functions. In formulation of a subsequent communications standard, division of the foregoing functional network elements may be changed, but this change does not affect implementation of the embodiments of this application.

Figure 1:
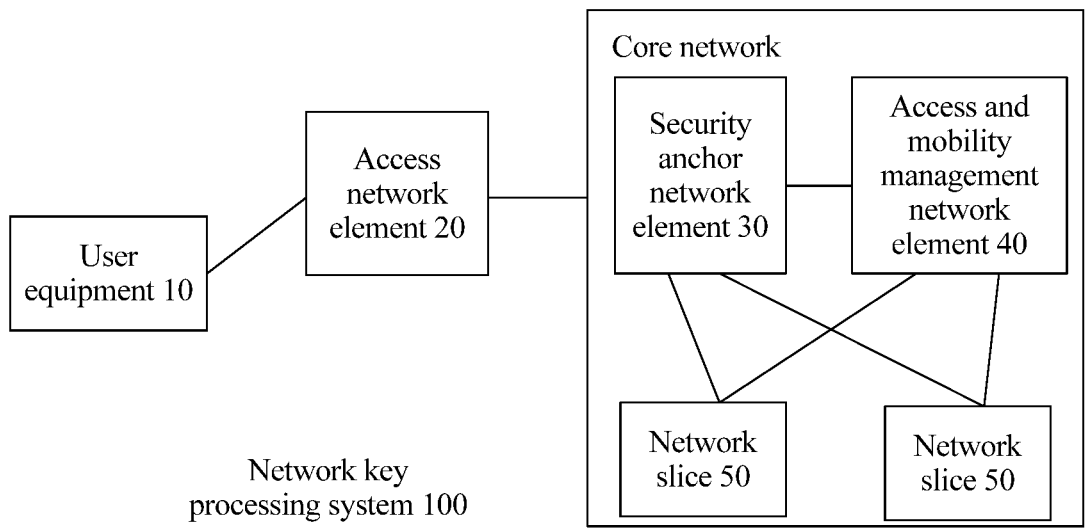
FIG. 1 is a schematic architectural diagram of network key processing according to an embodiment of this application.

FIG. 1 is a schematic architectural diagram of network key processing according to an embodiment of the present invention. As shown in FIG. 1, a network key processing system 100 may include user equipment 10, an access network element 20, a security anchor network element 30, an access and mobility management network element 40, and a network slice 50.

The access network element 20 may be configured to provide a network access service for the user equipment 10. In an implementation, the access network element 20 may include a NodeB, a base station controller radio network controller (RNC)), an access gateway, or the like. In an implementation, the user equipment 10 may include a user terminal such as a mobile phone, a tablet computer, a notebook computer, a mobile Internet device (MID), or a wearable device (for example, a smartwatch, a smart band, or a pedometer), or may include an IoT device, or may include other communications devices that can access an MNO network.

The security anchor network element 30 may be configured to provide services such as network authentication and key generation for all UEs accessing a network, and may include a network function, such as an SEAF, configured in a core network (CN).

In this embodiment of the present invention, the security anchor network element 30 is configured to generate a shared key for the access and mobility management network element 40, and is further configured to generate dedicated keys for a plurality of network slices 50 to be accessed by the user equipment 10.

The access and mobility management network element 40 is configured to send, to the user equipment 10, a parameter used by the security anchor network element 30 to generate the shared key and a parameter used to generate the dedicated keys, so that the user equipment can derive the dedicated keys for the network slices and then can access the network slices to be accessed by the user equipment. In this way, a dedicated key is set for each network slice, so that NAS signaling used for interaction between the user equipment and the network slice is not easily obtained, and network communication security is improved.

It is understood that when the access network element 20 includes only one network entity (for example, the NodeB), subsequently described operations performed by the access network element 20 are all performed by the network entity; when the access network element 20 includes a plurality of network entities (for example, the NodeB and the base station controller), subsequently described operations performed by the access network element 20 are collaboratively completed by the plurality of network entities.

It is understood that when the security anchor network element 30 includes only one network entity (for example, the SEAF), subsequently described operations performed by the security anchor network element 30 are all performed by the network entity; when the security anchor network element 30 includes a plurality of network entities (for example, the SEAF and the AMF), subsequently described operations performed by the security anchor network element 30 are collaboratively completed by the plurality of network entities.

It is understood that when the access and mobility management network element 40 includes only one network entity (for example, the AMF), subsequently described operations performed by the access and mobility management network element 40 are all performed by the network entity; when the access and mobility management network element 40 includes a plurality of network entities (for example, the SEAF and the AMF), subsequently described operations performed by the access and mobility management network element 40 are collaboratively completed by the plurality of network entities.

Herein, the collaborative completion means that the plurality of network entities each perform some operations, and all data and parameters generated in the operations may be transmitted between the plurality of network entities based on needs.

It should be noted that, not limited to the network functions shown in FIG. 1, the security anchor network element 30 may alternatively include more or fewer network functions and the access and mobility management network element 40 may alternatively include more or fewer slice network functions.

It should be noted that the names such as the security anchor network element, the access and mobility management network element, and the access network element described in this application may be other names in actual application, these network element names cannot constitute any limitation to this application, and all network elements having the functions and effects described in the embodiments of this application fall within the protection scope of this application.

Figure 2:
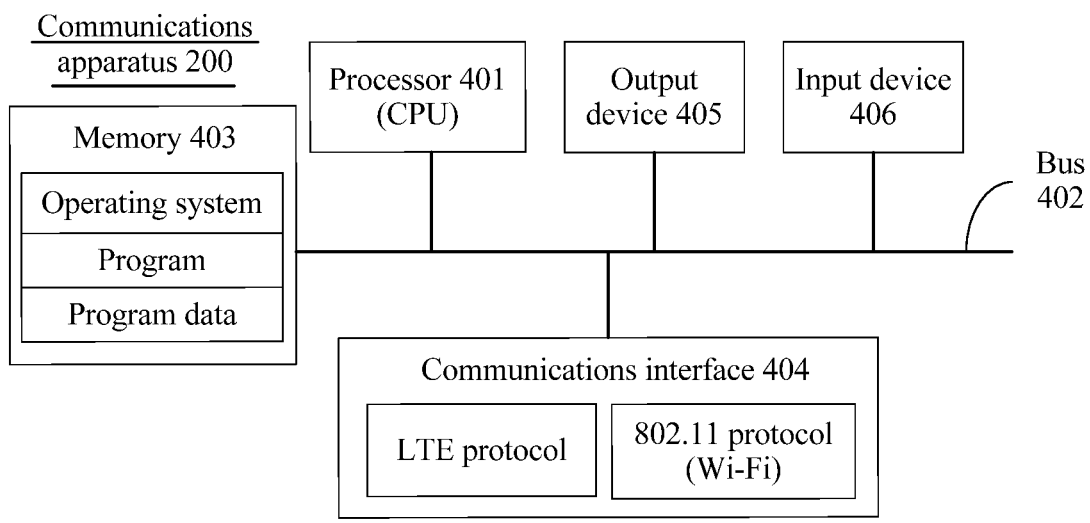
FIG. 2 is a schematic structural diagram of user equipment 10, a security anchor device 30, an access and mobility management device 40, and a network slice 50 according to an embodiment of this application.

FIG. 2 is a schematic diagram of a communications apparatus according to an embodiment of the present invention. The user equipment 10, the security anchor device 30, the access and mobility management device 40, or the network slice 50 in FIG. 1 may be implemented by using a communications apparatus (or system) 200 shown in FIG. 2.

As shown in FIG. 2, the communications apparatus (or system) 200 may include at least one processor 401, a memory 403, and at least one communications interface 404. These components may communicate with each other by using one or more communications buses 402.

It should be noted that FIG. 2 merely shows an implementation of this embodiment of the present invention. In actual application, the communications apparatus 200 may alternatively include more or fewer components, and this is not limited herein.

The communications interface 404 is configured to receive and send a radio frequency signal and is coupled with a receiver and a transmitter of the communications apparatus 200. The communications interface 404 communicates, by using radio frequency signals, with other communications devices and a communications network, for example, Ethernet, a radio access network (RAN), or a wireless local area network (WLAN). In an implementation, communication protocols supported by the communications interface 404 may include but are not limited to 2G/3G, LTE, Wi-Fi, 5G New Radio (NR), and the like.

The memory 403 is coupled with the processor 401 and configured to store various software programs and/or a plurality of sets of instructions. In an implementation, the memory 403 may include a high-speed random access memory, and may include a non-volatile memory, for example, one or more disk storage devices, flash devices, or other non-volatile solid-state storage devices. The memory 403 may store an operating system (briefly referred to as a system in the following), for example, an embedded operating system such as Android, Apple® iOS, Microsoft® Windows, or Linux. The memory 403 may be configured to store an implementation program of this embodiment of the present invention. The memory 403 may further store a network communication program. The network communication program may be used to communicate with one or more additional devices, one or more terminal devices, and one or more network devices.

The processor 401 may be a general-purpose central processing unit (CPU), a microprocessor, an application-specific integrated circuit (ASIC), or one or more integrated circuits used to control execution of a program in this solution of the present invention.

In some embodiments, the communications apparatus 200 may further include an output device 405 and an input device 406. The output device 405 communicates with the processor 401 and may display information in a plurality of manners. For example, the output device 405 may be a liquid crystal display (LCD), a light emitting diode (LED) display device, a cathode-ray tube (CRT) display device, a projector (projector), or the like. The input device 406 communicates with the processor 401 and may receive a user input in a plurality of manners. For example, the input device 406 may be a mouse, a keyboard, a touchscreen device, a sensor device, or the like. For ease of use by a user of the output device 405 and the input device 406, in some embodiments, the memory 202 may further store a user interface program. The user interface program may vividly display content of an application program by using a graphical operation interface, and receive, by using an input control such as a menu, a dialog box, and a key, a control operation performed by the user on the application program.

When the communications apparatus 200 in FIG. 2 is implemented as the user equipment 10 in FIG. 1, the memory in the communications apparatus 200 may store one or more software modules and may be configured to provide functions such as sending an access request and sending a user authentication response. For details, refer to subsequent method embodiments. When the communications apparatus 200 in FIG. 2 is implemented as the security anchor device 30 in FIG. 1, the memory in the communications apparatus 200 may store one or more software modules and may be configured to provide a function such as key generation. For details, refer to subsequent method embodiments. When the communications apparatus 200 in FIG. 2 is implemented as the access and mobility management device 40 in FIG. 1, the memory in the communications apparatus 200 may store one or more software modules and may be configured to provide a function such as encrypting a key parameter. For details, refer to subsequent method embodiments. When the communications apparatus 200 in FIG. 2 is implemented as the network slice 50 in FIG. 1, the memory in the communications apparatus 200 may store one or more software modules and may be configured to provide a function such as network function encryption. For details, refer to subsequent method embodiments.

The following describes in detail, with reference to embodiments in FIG. 3A to FIG. 7C, a network key processing method provided in the embodiments of the present invention.

Figure 3A:
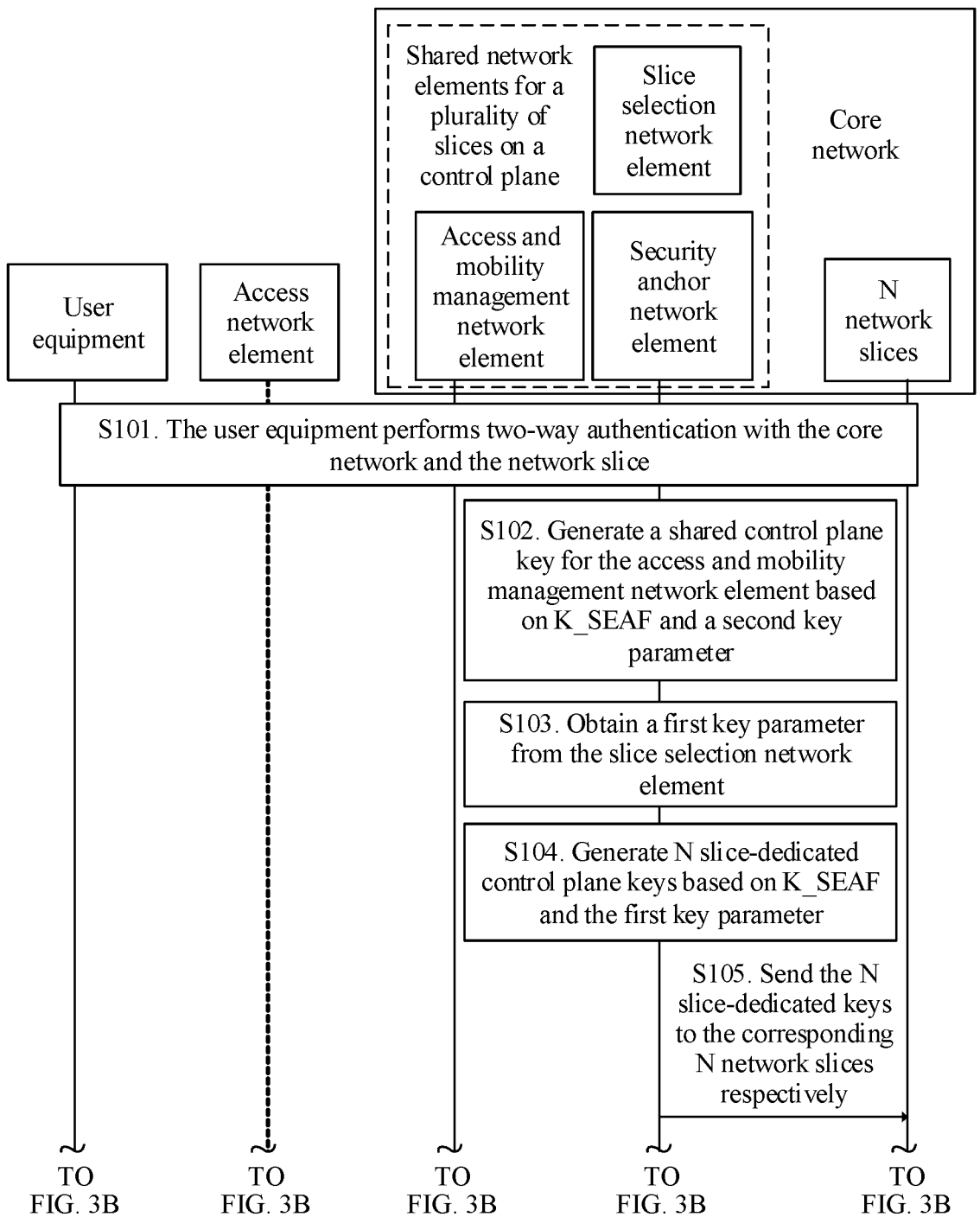
FIG. 3A and FIG. 3B are a schematic flowchart of a first embodiment of a network key processing method according to an embodiment of this application.
Figure 3B:
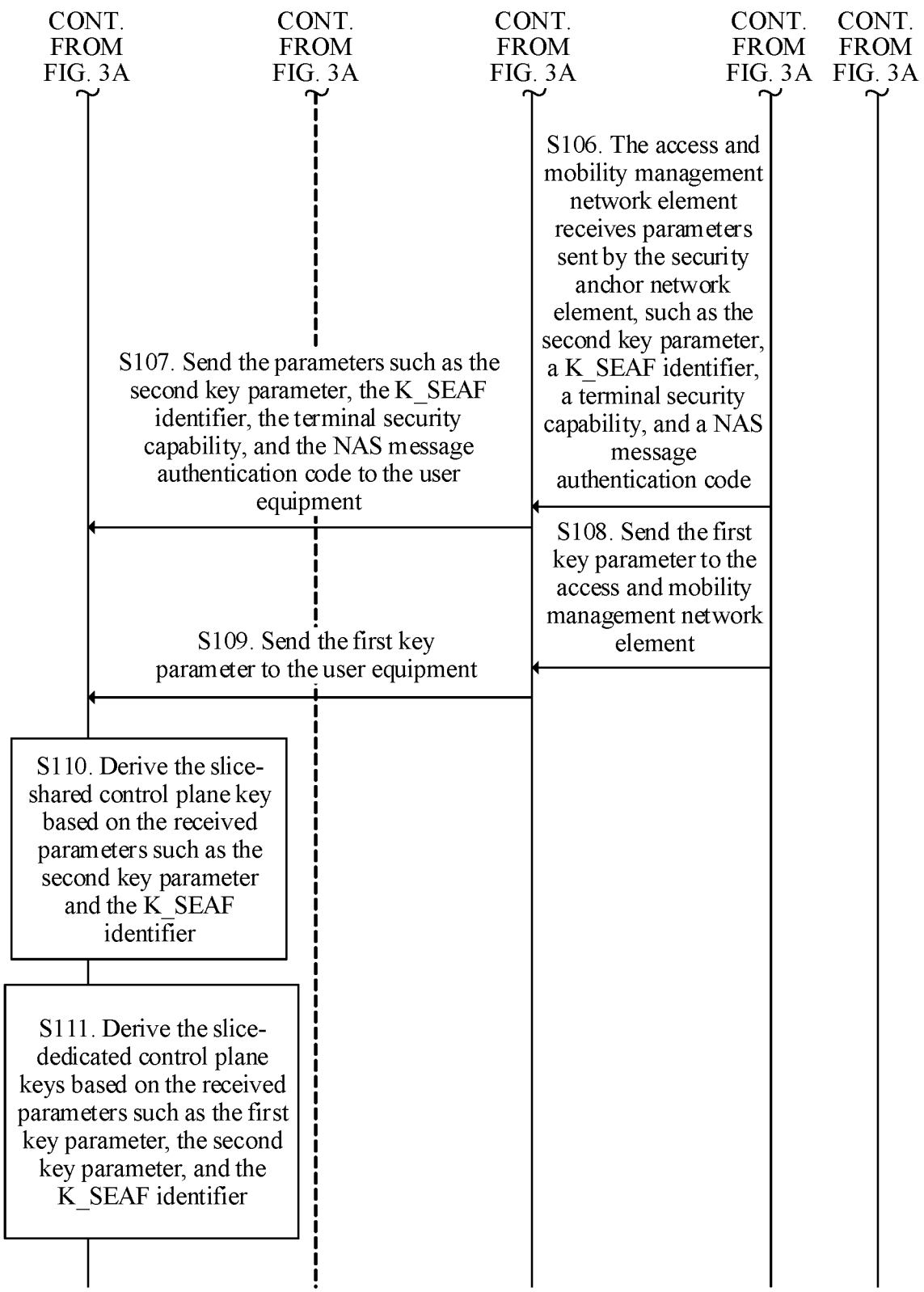

FIG. 3A and FIG. 3B are a schematic flowchart of a first embodiment of a network key processing method according to an embodiment of the present invention. In the embodiment of FIG. 3A and FIG. 3B, a security anchor network element generates slice-dedicated control plane keys. The following provides detailed descriptions.

S101. User equipment performs two-way authentication with a core network (an SEAF) and a network slice.

When the user equipment performs the authentication, the core network generates a root key K_SEAF. A slice selection network element (for example, a network slice selection function (NSSF)) in the core network selects N network slices Slc-ID1, . . . , and Slc-IDN (for example, slice IDs have been determined) for the user equipment. In other words, the slice selection network element obtains identifier information of the determined N network slices.

S102. The security anchor network element generates a shared key for an access and mobility management network element based on K_SEAF and a second key parameter, where the shared key is a shared control plane key.

The shared control plane key is used for a shared network function on a control plane of the N network slices, and the second key parameter includes information such as a key algorithm type distinguisher (Algorithm Distinguisher) and a key algorithm ID (Algorithm ID).

S103. The security anchor network element obtains a first key parameter from the slice selection network element, where the first key parameter includes the identifier information of the N network slices.

S104. The security anchor network element generates N slice-dedicated keys based on K_SEAF and the first key parameter, where the dedicated keys are dedicated control plane keys.

The first key parameter may include the network slice IDs: Slc-ID1, . . . , and Slc-IDN. Slice-dedicated control plane root keys (KCP-S1, . . . , and KCP-SN) are generated for the network slices n=1, . . . , and N respectively.

It should be noted that the security anchor network element may further generate a dedicated key for each network slice based on the second key parameter that includes the key algorithm type distinguisher, the key algorithm ID, and the like. The key algorithm type distinguisher needs to be set to a value corresponding to a slice-dedicated control plane key algorithm.

S105. The security anchor network element sends the N slice-dedicated keys to the corresponding N network slices respectively.

After receiving the dedicated control plane keys, each of the network slices may further respond with a message indicating successful reception to the security anchor network element.

S106. The access and mobility management network element receives parameters sent by the security anchor network element, such as the second key parameter, a K_SEAF identifier, a terminal security capability, and a NAS message authentication code.

S107. The access and mobility management network element sends the parameters such as the second key parameter, the K_SEAF identifier, the terminal security capability, and the NAS message authentication code to the user equipment.

S108. The security anchor network element sends the first key parameter to the access and mobility management network element.

The first key parameter may alternatively be sent by the slice selection network element (for example, the network slice selection function (NSSF)) to the access and mobility management network element.

S109. The access and mobility management network element sends the first key parameter to the user equipment.

The first key parameter may include information such as the slice IDs (for example, Slc-ID1, . . . , and Slc-IDN) and the key algorithm type distinguisher that is set to the value corresponding to the slice-dedicated control plane key algorithm (NAS-Slc). Because the identifier information of the slices is included, and an existing sending command cannot carry the identifier information, a sending command defined in this application is a slice security mode command (SSMC), and the first key parameter is sent to the user equipment by using the SSMC.

S110. The user equipment derives the slice-shared control plane key (for an access and mobility management function (AMF) or a common control network function (CCNF)) based on the received parameters such as the second key parameter and the K_SEAF identifier.

S111. The user equipment derives the slice-dedicated control plane keys based on the received parameters such as the first key parameter, the second key parameter (including a key algorithm type distinguisher that needs to be set to a value corresponding to a slice-dedicated control plane key algorithm), and the K_SEAF identifier.

For example, a parameter of a generation function, e.g. key derivation function (KDF), for generating a key for an $N^{th}$ slice is KDF(K_SEAF, Slc-ID1, NAS-Slc, Alg-ID), where the KDF represents the generation function used by the security anchor network element to generate a dedicated key for each network slice, NAS-Slc represents the key algorithm type distinguisher parameter that is set to the value corresponding to the slice-dedicated control plane key algorithm, and Alg-ID represents the key algorithm ID.

In this way, when obtaining a key parameter used by the security anchor network element to generate a dedicated control plane key for each network slice, the user equipment can generate the corresponding key based on the key parameter and access the network slice to be accessed by the user equipment. Therefore, network communication security is improved, and normal communication of the user equipment is ensured.

Figure 4A:
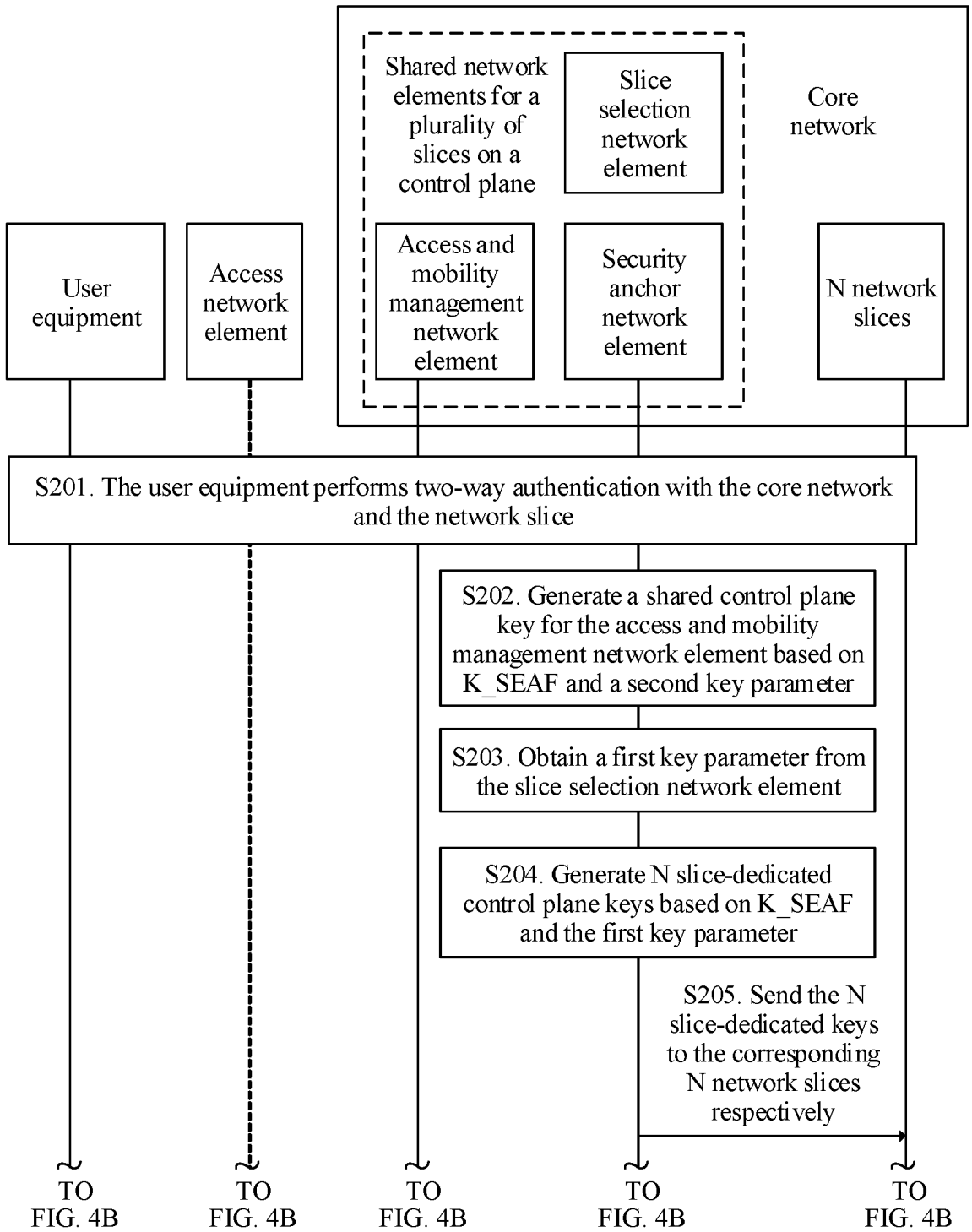
FIG. 4A and FIG. 4B are a schematic flowchart of a second embodiment of a network key processing method according to an embodiment of this application.
Figure 4B:
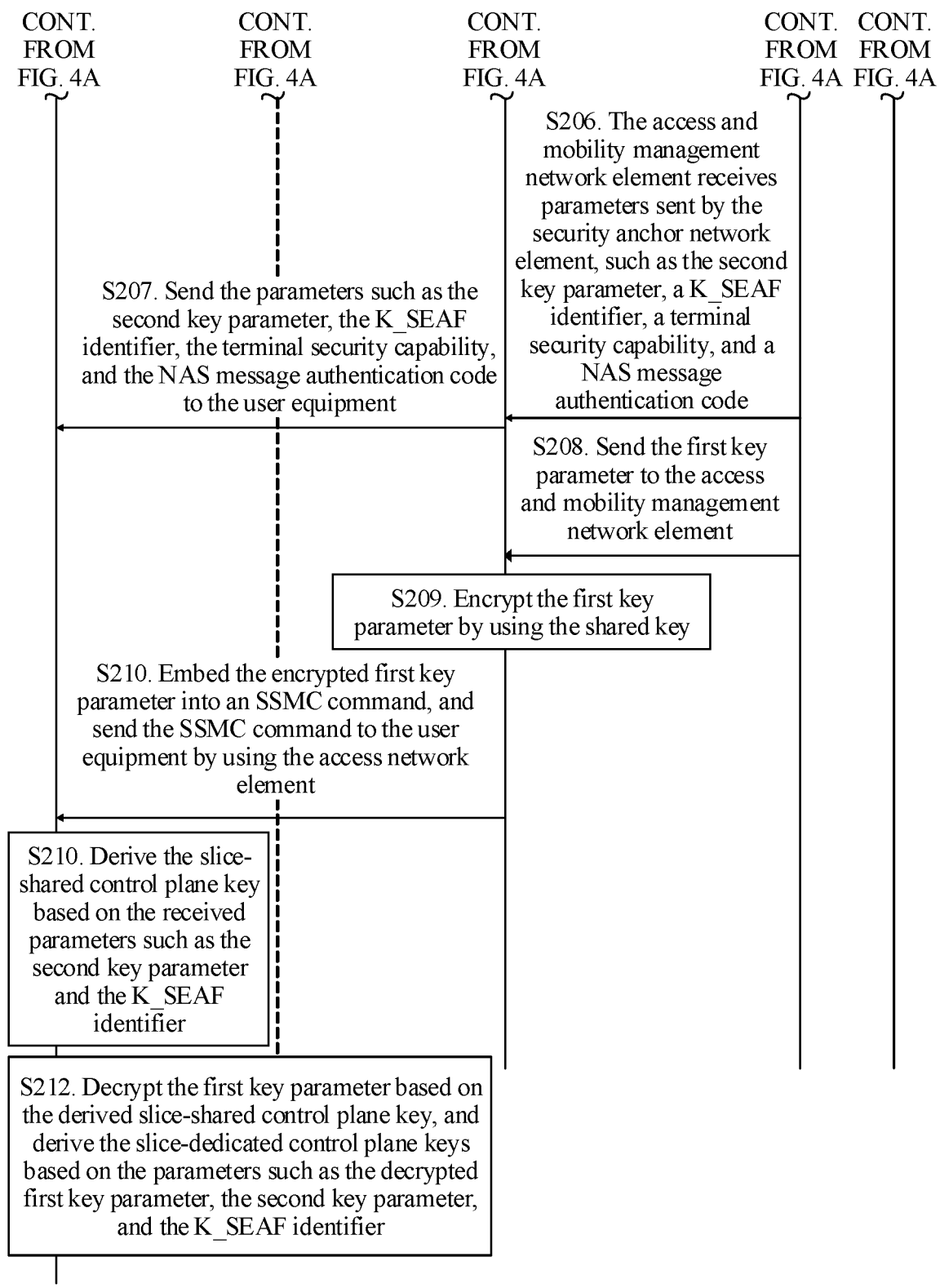

FIG. 4A and FIG. 4B are a schematic flowchart of a second embodiment of a network key processing method according to an embodiment of the present invention. In the embodiment of FIG. 4A and FIG. 4B, a parameter used for generating a slice-dedicated control plane key is further encrypted before being sent to user equipment. The following provides detailed descriptions.

S201. The user equipment performs two-way authentication with a core network (an SEAF) and a network slice.

S202. The security anchor network element generates a shared control plane key for an access and mobility management network element based on K_SEAF and a second key parameter.

S203. The security anchor network element obtains a first key parameter from a slice selection network element, where the first key parameter includes identifier information of N network slices.

S204. The security anchor network element generates N slice-dedicated control plane keys based on K_SEAF and the first key parameter.

S205. The security anchor network element sends the N slice-dedicated control plane keys to the corresponding N network slices respectively.

S206. The access and mobility management network element receives parameters sent by the security anchor network element, such as the second key parameter, a K_SEAF identifier, a terminal security capability, and a NAS message authentication code.

S207. The access and mobility management network element sends the parameters such as the second key parameter, the K_SEAF identifier, the terminal security capability, and the NAS message authentication code to the user equipment.

S208. The security anchor network element sends the first key parameter to the access and mobility management network element.

S209. The access and mobility management network element encrypts the first key parameter by using the shared key.

Because the first key parameter includes the identifier information of the network slices to be accessed by the user equipment, in actual application, the identifier information of the network slices is private. When obtaining an identifier of a network slice to be accessed by the user equipment, an attacker may obtain a type of the network slice to be accessed by the user equipment, and launch other attacks. This causes security risks to the user equipment. Therefore, before the first key parameter is transmitted, the first key parameter is encrypted.

When the first key parameter is encrypted, encryption integrity further needs to be protected. A section of data may be generated and added to an encrypted data packet, so that a receiver end determines whether the data packet is modified.

S210. The access and mobility management network element embeds the encrypted first key parameter into an SSMC command, and sends the SSMC command to the user equipment by using an access network element.

S211. The user equipment derives the slice-shared control plane key (for an AMF or a CCNF) based on the received parameters such as the second key parameter and the K_SEAF identifier.

S212. The user equipment decrypts the first key parameter based on the derived slice-shared control plane key, and derives the slice-dedicated control plane keys based on the parameters such as the decrypted first key parameter, the second key parameter (including a key algorithm type distinguisher that needs to be set to a value corresponding to a slice-dedicated control plane key algorithm), and the K_SEAF identifier.

Figure 5A:
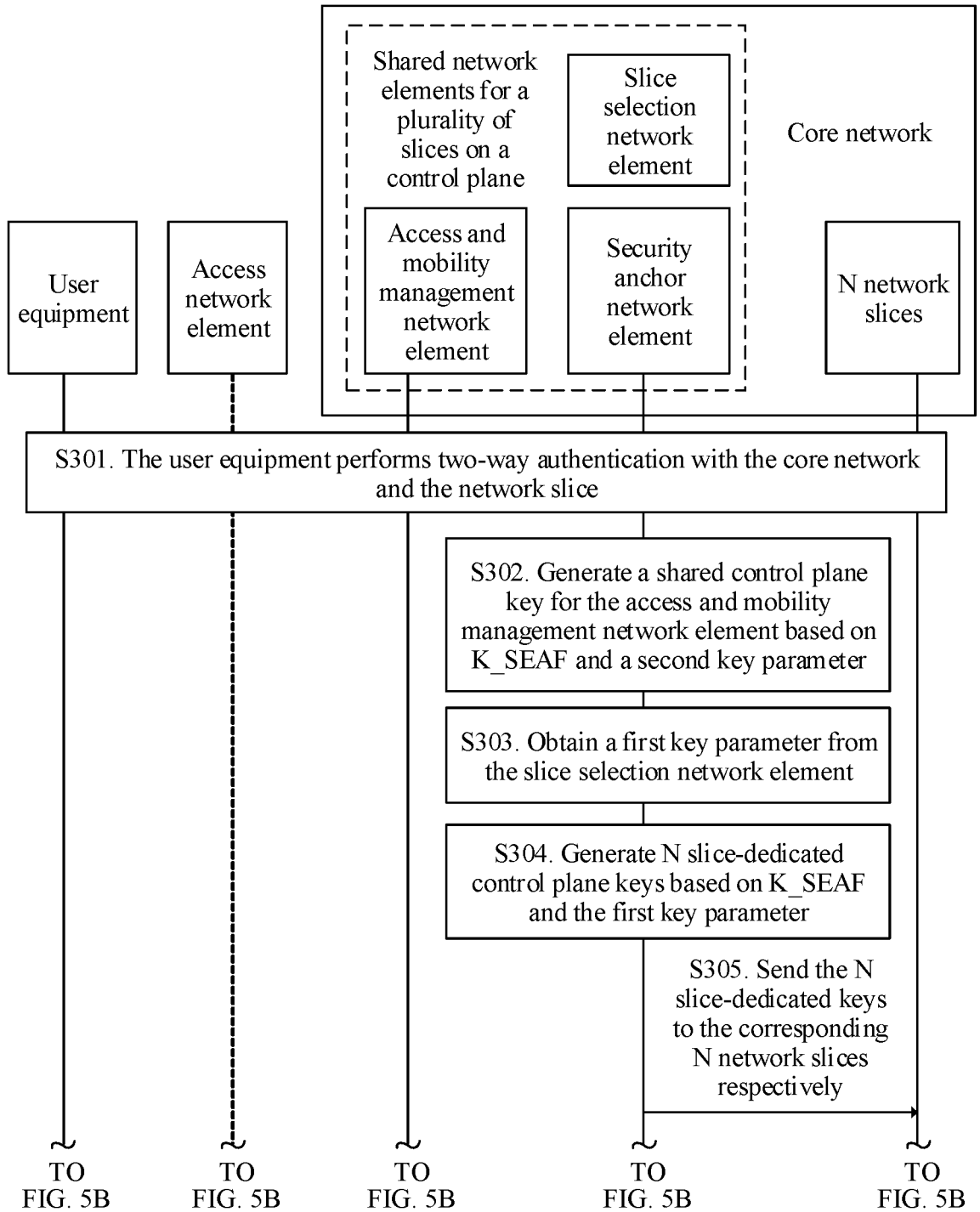
FIG. 5A and FIG. 5B are a schematic flowchart of a third embodiment of a network key processing method according to an embodiment of this application.
Figure 5B:
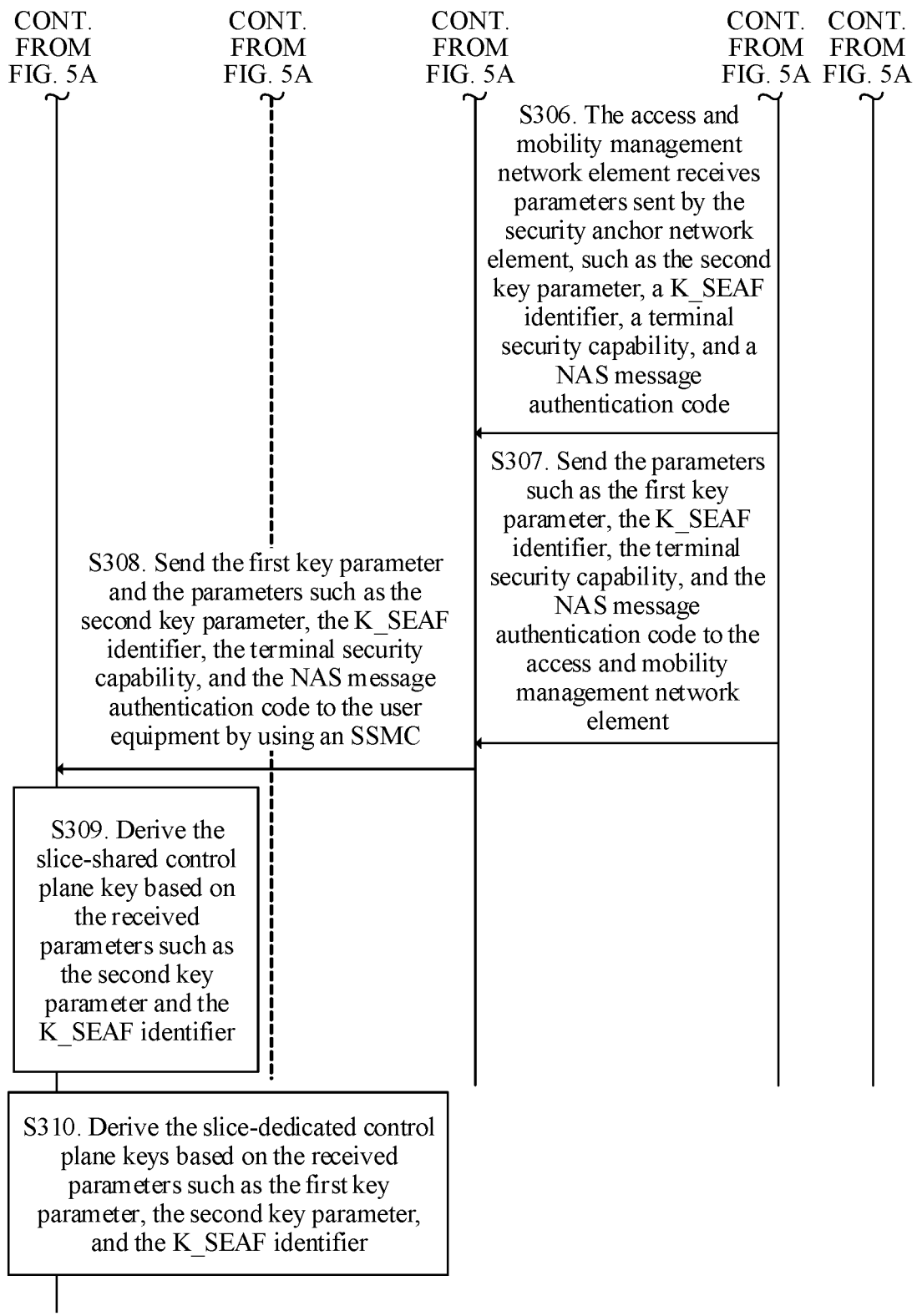

FIG. 5A and FIG. 5B are a schematic flowchart of a third embodiment of a network key processing method according to an embodiment of the present invention. In the embodiment of FIG. 5A and FIG. 5B, to optimize and reduce an amount of transferred signaling, one piece of SSMC signaling is sent to transfer a parameter for a slice-shared control plane key and a parameter for a slice-dedicated control plane key, thereby saving air interface resources. The following provides detailed descriptions.

S301. User equipment performs two-way authentication with a core network (an SEAF) and a network slice.

S302. The security anchor network element generates a shared key for an access and mobility management network element based on K_SEAF and a second key parameter.

S303. The security anchor network element obtains a first key parameter from a slice selection network element, where the first key parameter includes identifier information of N network slices.

S304. The security anchor network element generates N slice-dedicated keys based on the first key parameter and K_SEAF.

S305. The security anchor network element sends the N slice-dedicated control plane keys to the corresponding N network slices respectively.

S306. The access and mobility management network element receives parameters sent by the security anchor network element, such as the second key parameter, a K_SEAF identifier, a terminal security capability, and a NAS message authentication code.

S307. The security anchor network element sends the parameters such as the first key parameter, the K_SEAF identifier, the terminal security capability, and the NAS message authentication code to the access and mobility management network element.

S308. The access and mobility management network element sends the first key parameter and the parameters such as the second key parameter, the K_SEAF identifier, the terminal security capability, and the NAS message authentication code to the user equipment by using an SSMC.

In this way, one piece of SSMC signaling is sent to transfer a parameter for a slice-shared control plane key and a parameter for a slice-dedicated control plane key, thereby saving air interface resources.

S309. The user equipment derives the slice-shared control plane key (for an AMF or a CCNF) based on the received parameters such as the second key parameter and the K_SEAF identifier.

S310. The user equipment derives the slice-dedicated control plane keys based on the received parameters such as the first key parameter, the second key parameter (including a key algorithm type distinguisher that needs to be set to a value corresponding to a slice-dedicated control plane key algorithm), and the K_SEAF identifier.

Figure 6A:
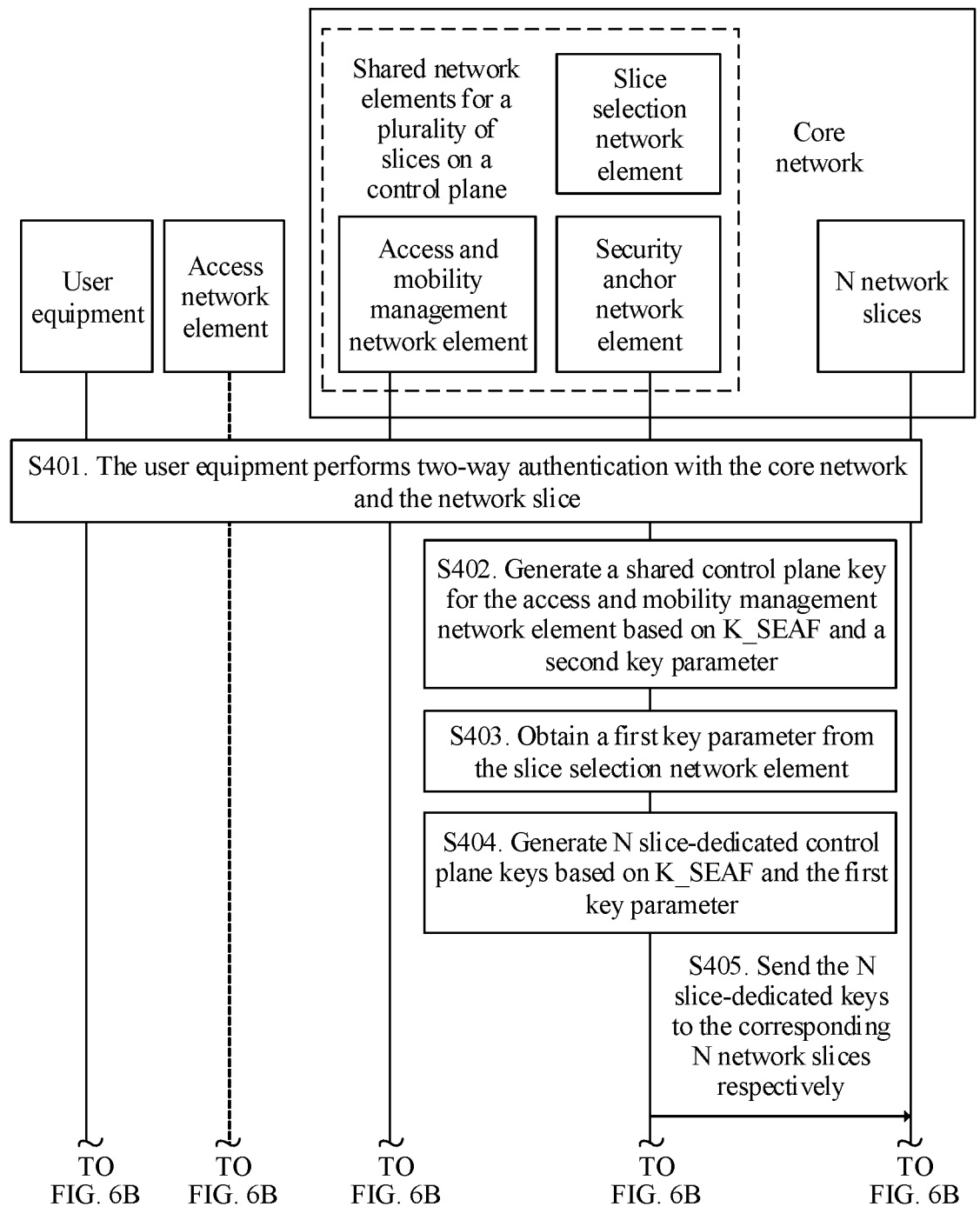
FIG. 6A and FIG. 6B are a schematic flowchart of a fourth embodiment of a network key processing method according to an embodiment of this application.
Figure 6B:
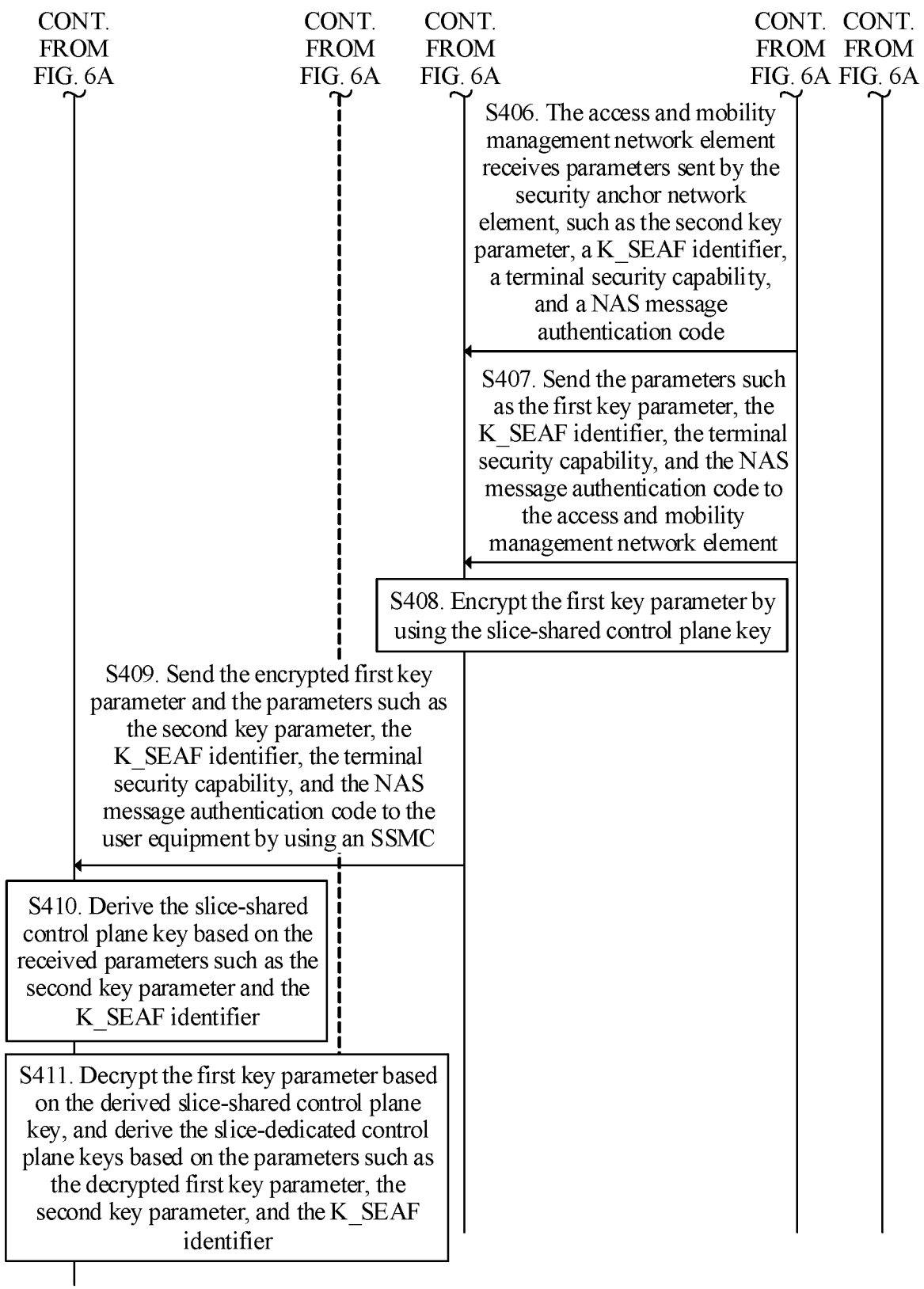

FIG. 6A and FIG. 6B are a schematic flowchart of a fourth embodiment of a network key processing method according to an embodiment of the present invention. In the embodiment of FIG. 6A and FIG. 6B, to optimize and reduce an amount of transferred signaling, one piece of SSMC signaling is sent to transfer a parameter for a slice-shared key and a parameter for a slice-dedicated key, thereby saving air interface resources, and before an SSMC is sent, the parameter for a slice-dedicated key is encrypted. The following provides detailed descriptions.

S401. User equipment performs two-way authentication with a core network (an SEAF) and a network slice.

S402. The security anchor network element generates a slice-shared control plane key for an access and mobility management network element based on K_SEAF and a second key parameter.

S403. The security anchor network element obtains a first key parameter from a slice selection network element, where the first key parameter includes identifier information of N network slices.

S404. The security anchor network element generates N slice-dedicated control plane keys based on K_SEAF and the first key parameter.

S405. The security anchor network element sends the N slice-dedicated control plane keys to the corresponding N network slices respectively.

S406. The access and mobility management network element receives parameters sent by the security anchor network element, such as the second key parameter, a K_SEAF identifier, a terminal security capability, and a NAS message authentication code.

S407. The security anchor network element sends the parameters such as the first key parameter, the K_SEAF identifier, the terminal security capability, and the NAS message authentication code to the access and mobility management network element.

S408. The access and mobility management network element encrypts the first key parameter by using the slice-shared control plane key.

S409. The access and mobility management network element sends the encrypted first key parameter and the parameters such as the second key parameter, the K_SEAF identifier, the terminal security capability, and the NAS message authentication code to the user equipment by using an SSMC.

S410. The user equipment derives the slice-shared control plane key (for an AMF or a CCNF) based on the received parameters such as the second key parameter and the K_SEAF identifier.

S411. The user equipment decrypts the first key parameter based on the derived slice-shared control plane key, and derives the slice-dedicated control plane keys based on the parameters such as the decrypted first key parameter, the second key parameter (including a key algorithm type distinguisher that needs to be set to a value corresponding to a slice-dedicated control plane key algorithm), and the K_SEAF identifier.

Figure 7A:
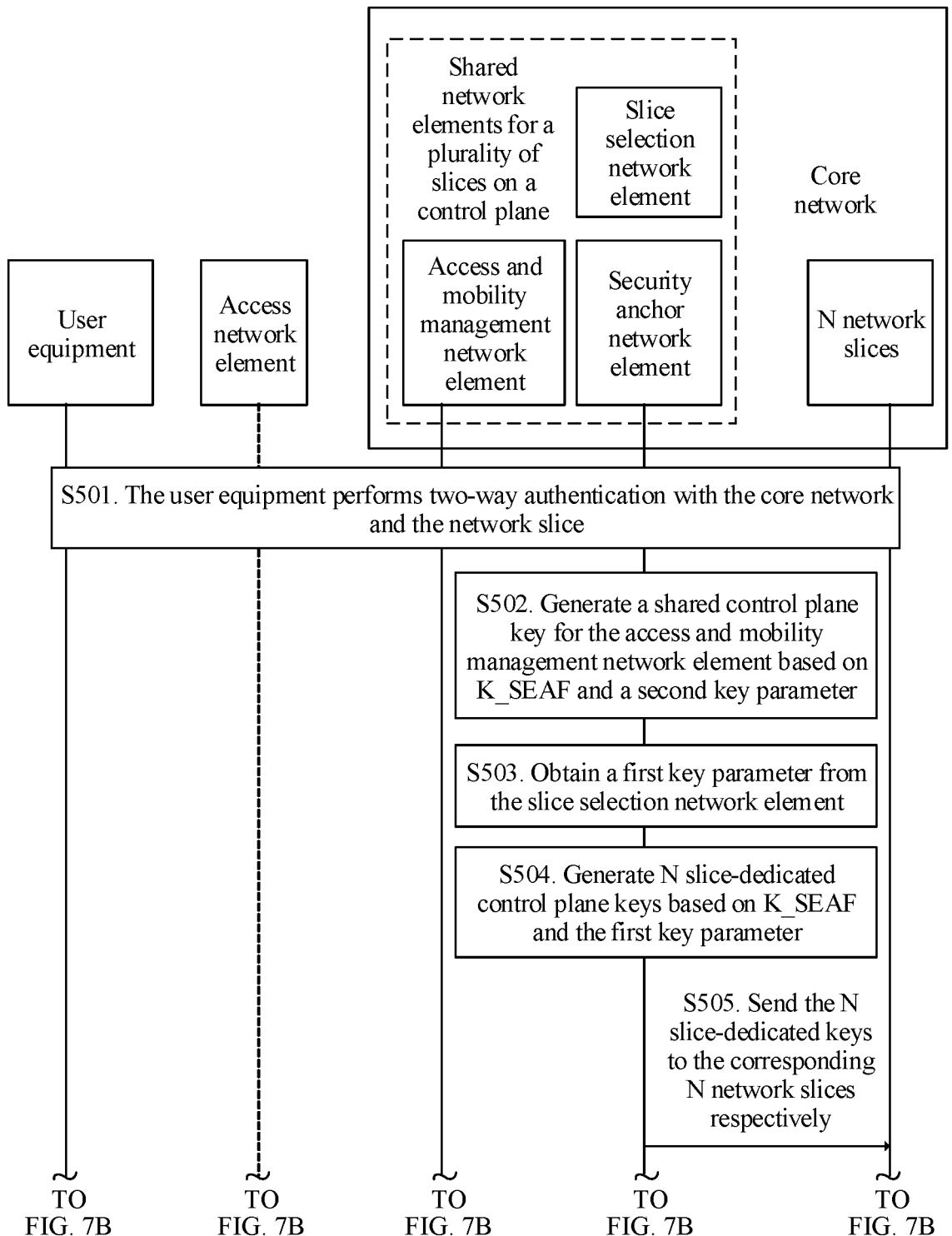
FIG. 7A to FIG. 7C are a schematic flowchart of a fifth embodiment of a network key processing method according to an embodiment of this application.
Figure 7B:
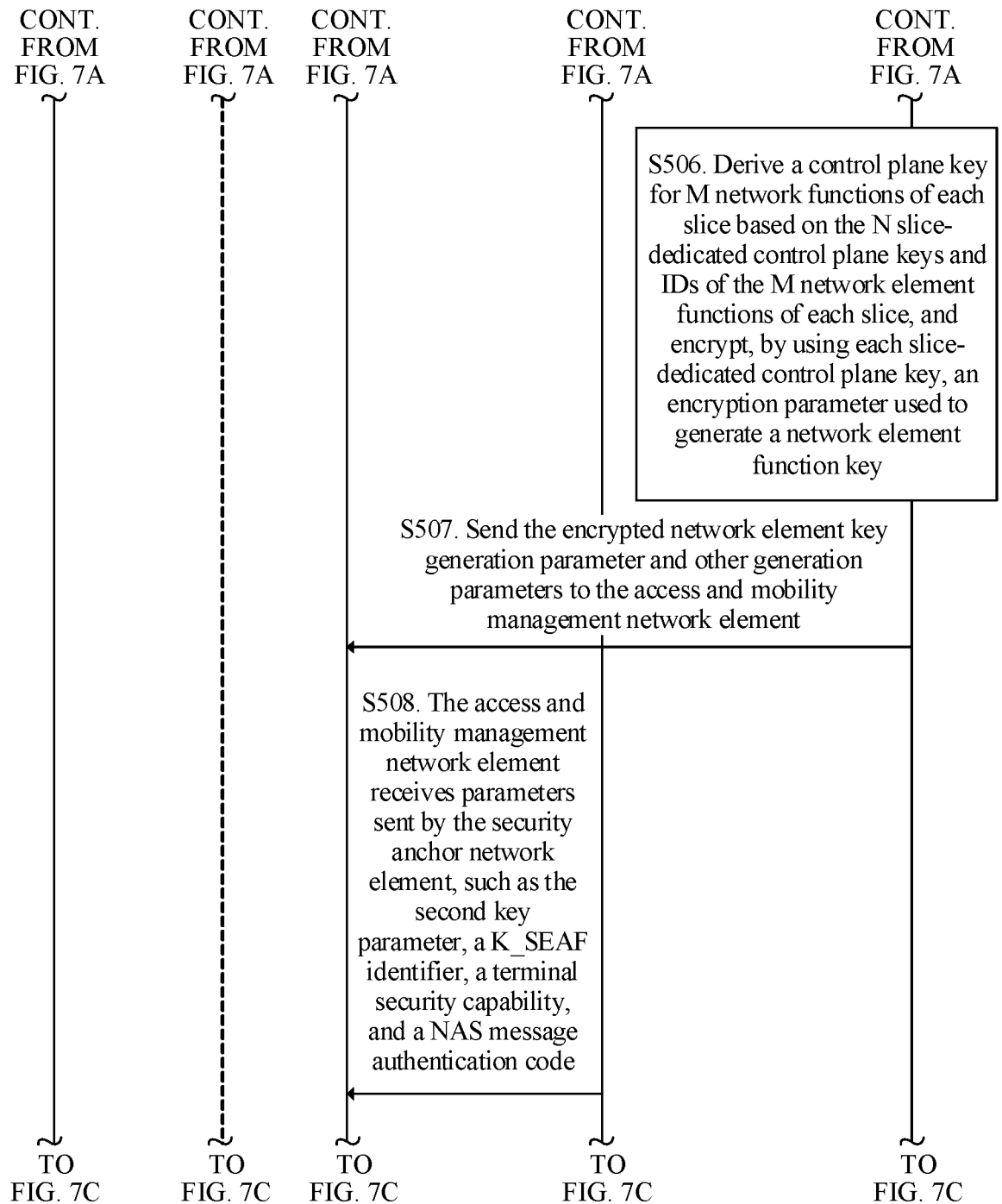
Figure 7C:
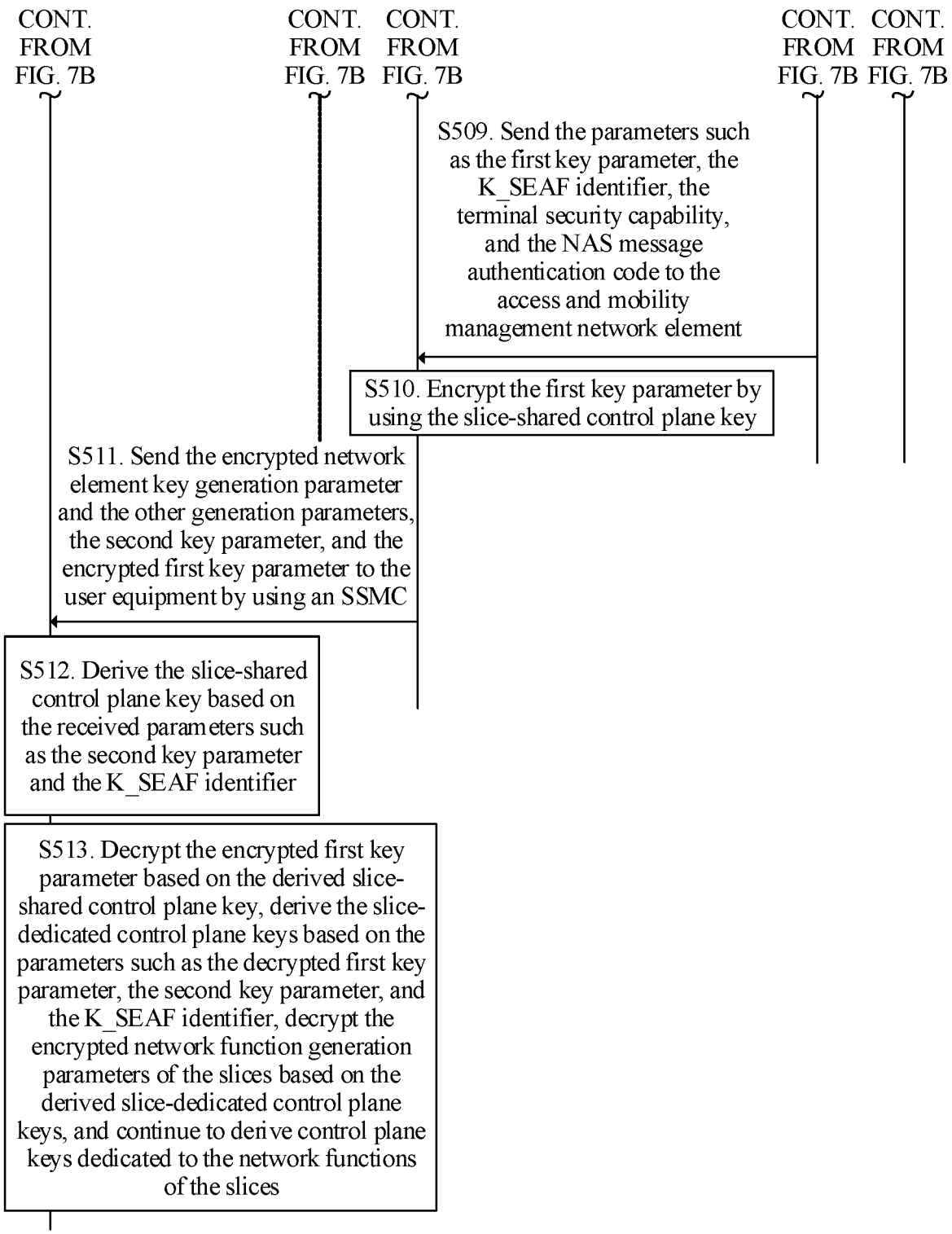

FIG. 7A to FIG. 7C are a schematic flowchart of a fifth embodiment of a network key processing method according to an embodiment of the present invention. In the embodiment of FIG. 7A to FIG. 7C, to optimize and reduce an amount of transferred signaling, one piece of SSMC signaling is sent to transfer a parameter for a slice-shared key and a parameter for a slice-dedicated key, thereby saving air interface resources; before an SSMC is sent, the parameter for a slice-dedicated key is encrypted; and for each slice that includes a plurality of control plane network functions, encryption (and key generation and distribution) is performed on a per network element basis. The following provides detailed descriptions.

S501. User equipment performs two-way authentication with a core network (an SEAF) and a network slice.

S502. The security anchor network element generates a slice-shared control plane key for an access and mobility management network element based on K_SEAF and a second key parameter.

S503. The security anchor network element obtains a first key parameter from a slice selection network element, where the first key parameter includes identifier information of N network slices.

S504. The security anchor network element generates N slice-dedicated keys based on K_SEAF and the first key parameter.

S505. The security anchor network element sends the N slice-dedicated control plane keys to the corresponding N network slices respectively.

S506. The N network slices derive a control plane key for M network functions of each slice based on the N slice-dedicated control plane keys and IDs of the M network element functions of the slice: NF-ID1, . . . , and NF-IDM. For example, a derivation function may be KDF(KCP-sn, NF-IDm, Slc-NF, Alg-ID). Then, an encryption parameter used to generate a network element function key is encrypted by using each slice-dedicated control plane key. The encryption parameter includes function identifiers of the M network functions, for example, enc(KCP-sn, NF-IDm), where KCP-sn is a control plane key dedicated to the network slice, and NF-IDm is a function identifier of an $m^{th}$ network function.

S507. The network slices send the encrypted network element key generation parameter and other generation parameters such as Slc-NF and Alg-ID to the access and mobility management network element.

S508. The access and mobility management network element receives parameters sent by the security anchor network element, such as the second key parameter, a K_SEAF identifier, a terminal security capability, and a NAS message authentication code.

S509. The security anchor network element sends the parameters such as the first key parameter, the K_SEAF identifier, the terminal security capability, and the NAS message authentication code to the access and mobility management network element.

S510. The access and mobility management network element encrypts the first key parameter by using the slice-shared control plane key.

S511. The access and mobility management network element sends the encrypted network element key generation parameter, the other generation parameters such as Slc-NF and Alg-ID, the second key parameter, and the encrypted first key parameter to the user equipment by using an SSMC.

S512. The user equipment derives the slice-shared control plane key (for an AMF or a CCNF) based on the received parameters such as the second key parameter and the K_SEAF identifier.

S513. The user equipment decrypts the encrypted first key parameter based on the derived slice-shared control plane key, derives the slice-dedicated control plane keys based on the parameters such as the decrypted first key parameter, the second key parameter, and the K_SEAF identifier, decrypts the encrypted network function generation parameters of the slices based on the derived slice-dedicated control plane keys, and continues to derive control plane keys dedicated to the network functions of the slices, and for each slice n, generates a key KDF(KCP-sn, NF-ID1, Slc-NF, Alg-ID) for an $m^{th}$ network function by using a key generation function.

Figure 8:
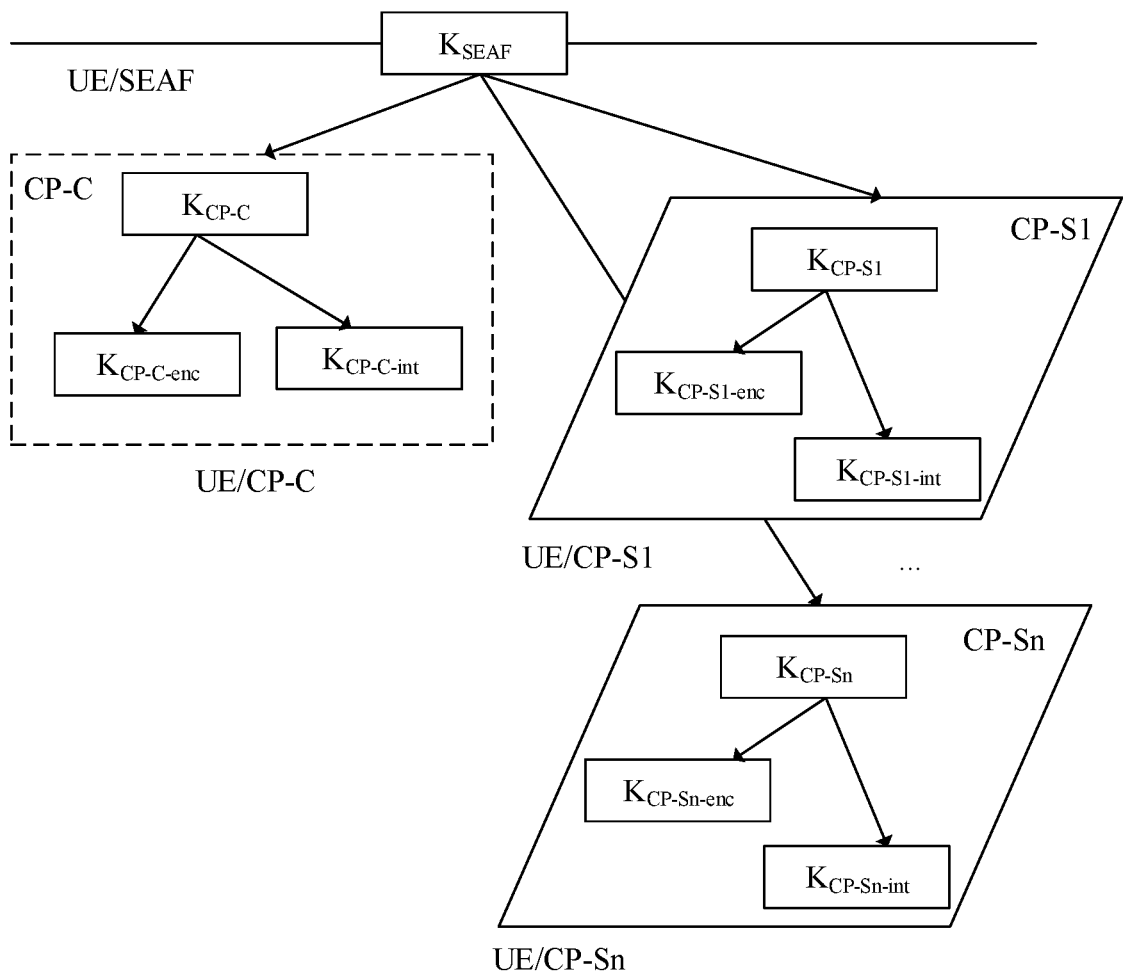
FIG. 8 is a schematic diagram of a key architecture according to an embodiment of this application.
Figure 9:
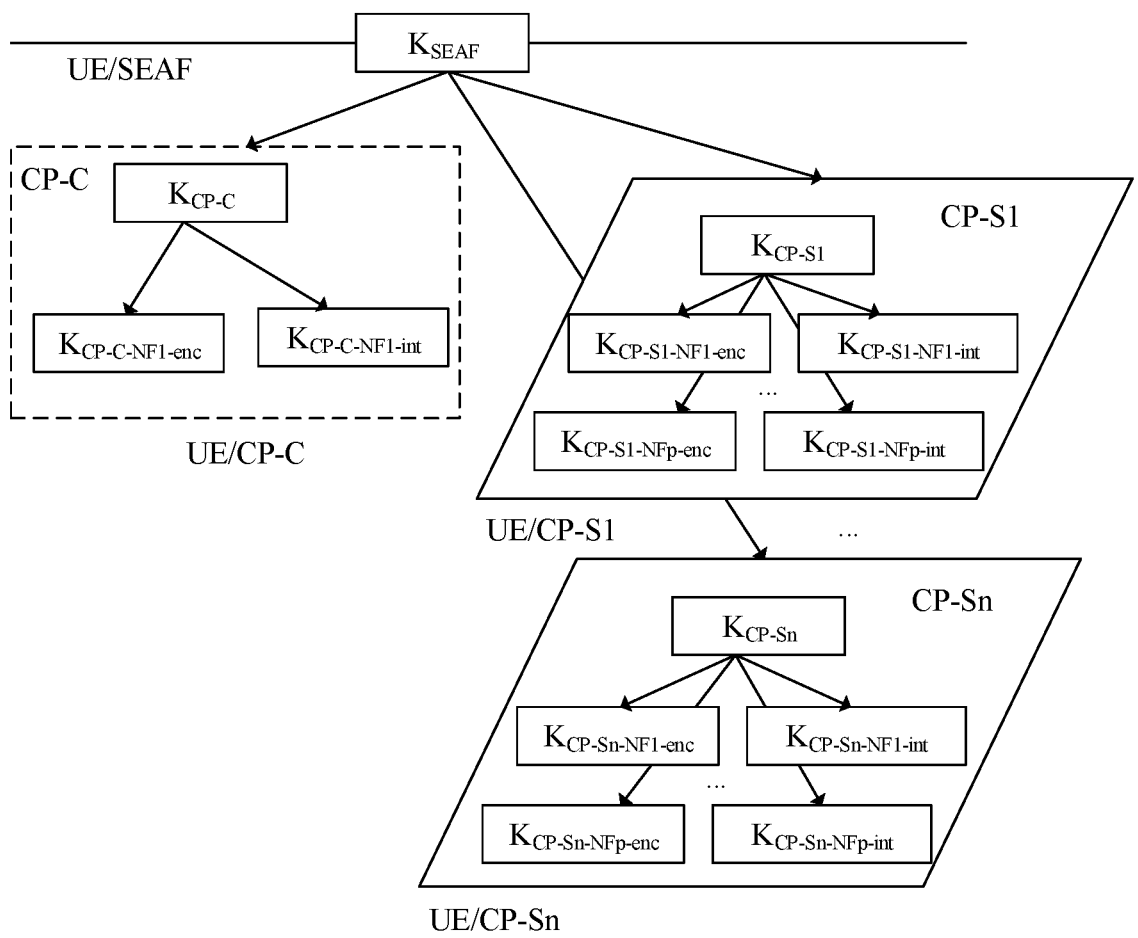
FIG. 9 is a schematic diagram of another key architecture according to an embodiment of this application.

In this application, keys and mutual derivation relationships are finally obtained through key derivation and may be indicated by using a tree structure diagram (in other words, a key architecture). FIG. 8 is a (same) slice key architecture corresponding to the first to the fourth embodiments, and FIG. 9 is a slice key architecture corresponding to the fifth embodiment, where enc represents an encryption key, int represents an integrity protection key (a key required for generating a message authentication code MAC), "CP" indicates a control plane, Kcp-c indicates a shared control plane key, Kcp-s1 indicates a dedicated control plane key for a slice 1, Kcp-c-NF1-enc indicates an encryption key for a shared network function 1 on the control plane, Kcp-c-NF1-int indicates an integrity protection key for the shared network function 1 on the control plane, Kcp-s1-NF1-enc indicates an encryption key for a dedicated network function 1 on the control plane of the slice 1, and Kcp-s1-NF1-enc indicates an integrity protection key for the dedicated network function 1 on the control plane of the slice 1.

Figure 10:
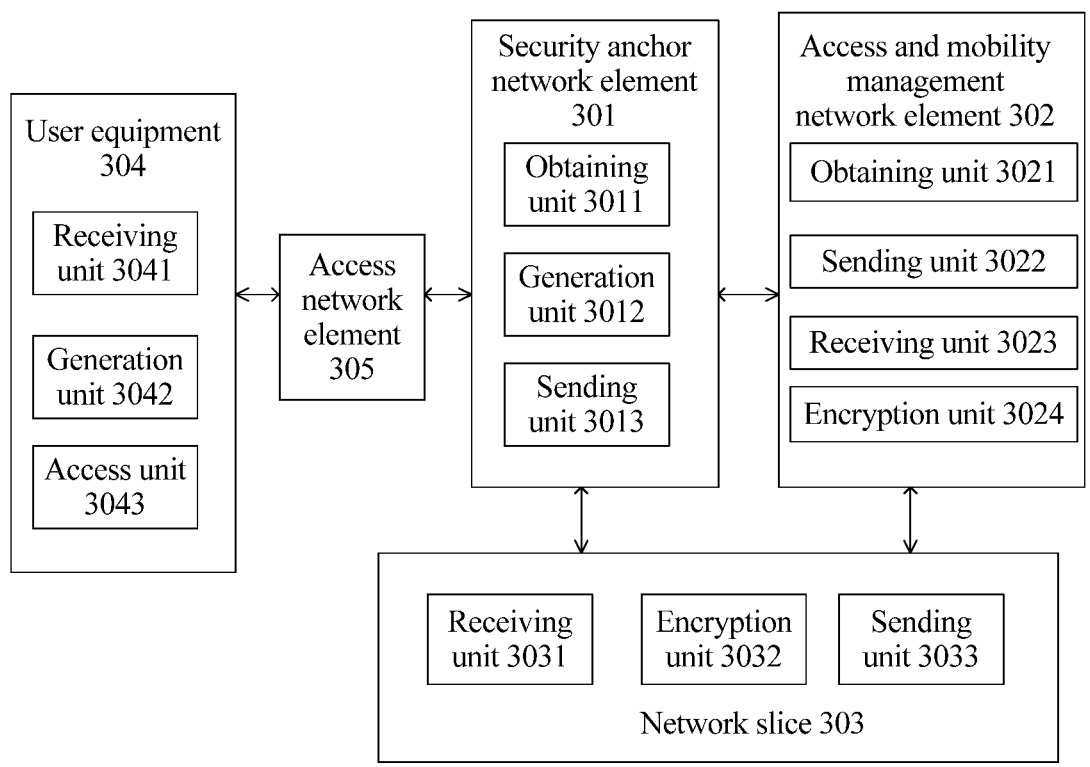
FIG. 10 is a schematic structural diagram of a network key processing system and related network elements in the network key processing system according to an embodiment of this application.

FIG. 10 is a schematic structural diagram of a network authentication system and related network elements in the network authentication system according to an embodiment of the present invention. As shown in FIG. 10, a network key processing system 300 may include a security anchor network element 301, an access and mobility management network element 302, a network slice 303, user equipment 304, and an access network element 305. The following provides detailed descriptions.

As shown in FIG. 10, the security anchor network element 301 may include an obtaining unit 3011, a generation unit 3012, and a sending unit 3013.

The obtaining unit 3011 is configured to obtain a first key parameter from a slice selection network element, where the first key parameter includes identifier information of N network slices, and the N network slices are network slices determined by the slice selection network element for the user equipment.

The generation unit 3012 is configured to generate N dedicated keys based on the first key parameter.

The sending unit 3013 is configured to send the N slice-dedicated keys to the corresponding N network slices respectively, so that after receiving the first key parameter from an access and mobility management network element, the user equipment generates the same N slice-dedicated keys and can access the N network slices.

Optionally, the sending unit 3013 is further configured to:

send the first key parameter to the access and mobility management network element, so that the access and mobility management network element sends the first key parameter to the user equipment.

Optionally, the generation unit 3012 is further configured to:

generate a shared key for the access and mobility management network element based on a second key parameter, and send the second key parameter to the access and mobility management network element, where the shared key is used for a shared network function of the N network slices, so that after receiving the second key parameter from the access and mobility management network element, the user equipment generates the same shared key and can access the shared network function of the N network slices.

As shown in FIG. 10, the access and mobility management network element 302 may include an obtaining unit 3021, a sending unit 3022, a receiving unit 3023, and an encryption unit 3024.

The obtaining unit 3021 is configured to obtain the first key parameter from a slice selection network element or a security anchor network element, where the first key parameter includes identifier information of N network slices, the N network slices are network slices determined by the slice selection network element for the user equipment, and the first key parameter is used by the security anchor network element to generate N slice-dedicated keys and send the N slice-dedicated keys to the corresponding N network slices.

The sending unit 3022 is configured to send the first key parameter to the user equipment, so that the user equipment generates the same N slice-dedicated keys based on the first key parameter and can access the N network slices.

Optionally, the sending unit 3022 is configured to:

send the first key parameter to the user equipment by using a slice security mode command.

Optionally, the receiving unit 3023 is configured to receive a second key parameter sent by the security anchor network element, where the second key parameter is used by the security anchor network element to generate a shared key for the access and mobility management network element, and the shared key is used for a shared network function of the N network slices; and the sending unit 3022 is further configured to send the second key parameter to the user equipment, so that the user equipment generates the same shared key based on the second key parameter and can access the shared network function of the N network slices.

Optionally, the sending unit 3022 is further configured to:

send the second key parameter to the user equipment by using the slice security mode command.

Optionally, the encryption unit 3024 is configured to: before the sending unit 3022 sends the first key parameter to the user equipment by using the slice security mode command, enable the access and mobility management network element to encrypt the first key parameter by using the shared key; and the sending unit 3022 is further configured to:

send the encrypted first key parameter to the user equipment by using the slice security mode command.

Optionally, the receiving unit 3023 is further configured to:

before the sending unit 3022 sends the encrypted first key parameter to the user equipment by using the slice security mode command, receive encryption parameters sent by the N network slices, where the encryption parameter is a parameter used by each of the N network slices to encrypt M network functions; and the sending unit 3022 is further configured to:

send the encrypted first key parameter and the encryption parameters to the user equipment by using the slice security mode command, so that the user equipment accesses the M network functions of the N network slices based on the encryption parameters.

As shown in FIG. 10, the network slice 303 may include a receiving unit 3031, an encryption unit 3032, and a sending unit 3033.

The receiving unit 3031 is configured to receive a dedicated key sent by a security anchor network element.

The encryption unit 3032 is configured to encrypt M network functions based on an encryption parameter, where the encryption parameter includes the dedicated key and function identifiers of the M network functions.

The sending unit 3033 is configured to send the encryption parameter to an access and mobility management network element, so that the access and mobility management network element sends the encryption parameter to user equipment, and then the user equipment accesses the M network functions of the network slice based on the encryption parameter.

As shown in FIG. 10, the user equipment 304 may include a receiving unit 3041, a generation unit 3042, and an access unit 3043.

The receiving unit 3041 is configured to receive a first key parameter sent by the access and mobility management network element, where the first key parameter includes identifier information of N network slices, the N network slices are network slices determined by the slice selection network element for the user equipment, and the first key parameter is used by a security anchor network element to generate N slice-dedicated keys and send the N slice-dedicated keys to the corresponding N network slices.

The generation unit 3042 is configured to generate the same N slice-dedicated keys based on the first key parameter, so that the user equipment can access the N network slices.

Optionally, the receiving unit 3041 is configured to:

receive the first key parameter sent by the access and mobility management network element by using a slice security mode command.

Optionally, the receiving unit 3041 is further configured to:

receive a second key parameter sent by the access and mobility management network element, where the second key parameter is used by the security anchor network element to generate a shared key for the access and mobility management network element, and the shared key is used for a shared network function of the N network slices; and the generation unit 3042 is configured to generate the same shared key based on the second key parameter, so that the user equipment can access the shared network function of the N network slices.

Optionally, the receiving unit 3041 is further configured to:

receive the second key parameter sent by the access and mobility management network element by using the slice security mode command.

Optionally, the receiving unit 3041 is further configured to:

receive the first key parameter that is encrypted based on the shared key and sent by the access and mobility management network element by using the slice security mode command.

Optionally, the receiving unit 3041 is further configured to:

receive encryption parameters and the first key parameter that is encrypted based on the shared key and sent by the access and mobility management network element by using the slice security mode command, where the encryption parameter is a parameter used by each of the N network slices to encrypt M network functions.

Optionally, the access unit 3043 is configured to access the M network functions of the N network slices based on the encryption parameters.

It should be noted that for implementation of the functional units of the security anchor network element 301, the access and mobility management network element 302, the network slice 303, and the user equipment 304, refer to corresponding description in the network key processing method in the embodiments respectively corresponding to FIG. 3A to FIG. 7C. Details are not described herein again.

It is understood by a person skilled in the art that, for the purpose of convenient and brief description, for a detailed working process of the foregoing system, apparatus, and unit, refer to a corresponding process in the foregoing method embodiments. Details are not described herein again.

The following describes, with reference to FIG. 11A to FIG. 11F, several implementations of deriving, by a first device, at least one key based on an intermediate key according to an embodiment of the present invention.

Figure 11A:
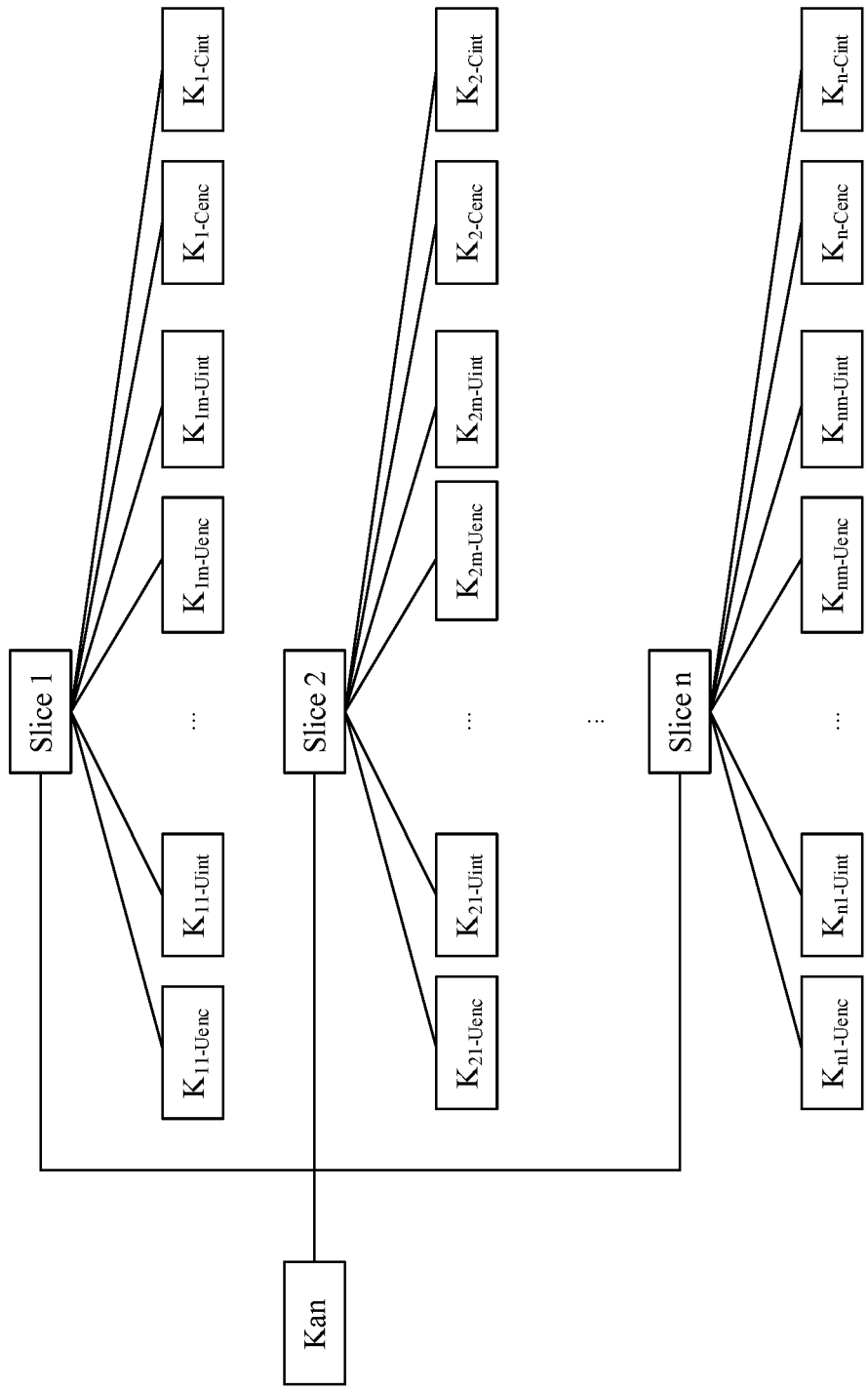
FIG. 11A to FIG. 11F are six schematic diagrams of key derivation performed by a first device according to an embodiment of this application.

In a first implementation, as shown in FIG. 11A, assuming that an application scenario of this implementation includes slices S1 to Sn and each slice includes sessions H1 to Hm, a first device may generate a set of user plane keys for each session of each slice based on an intermediate key, and each set of user plane keys includes a user plane encryption key Kij-Uenc and a user plane integrity key Kij-Uint, where i indicates a serial number of the slice, and j indicates a serial number of the session in the slice. The first device may generate a set of control plane keys for each slice based on the intermediate key, and each set of control plane keys includes a control plane encryption key Ki-Cenc and a control plane integrity key Ki-Uint, where i indicates the serial number of the slice. For example, the first device may generate a user plane encryption key K11-Uenc and a user plane integrity key K11-Uint for a first session of a first slice based on an intermediate key Kan, the first device may generate a user plane encryption key K12-Uenc and a user plane integrity key K12-Uint for a second session of the first slice based on the intermediate key Kan, and so on, and the first device may generate a user plane encryption key Knm-Uenc and a user plane integrity key Knm-Uint for an $m^{th}$ session of an $n^{th}$ slice based on the intermediate key Kan. The first device may generate a control plane encryption key K1-Cenc and a control plane integrity key K1-Cint for the first slice based on the intermediate key Kan, the first device may generate a control plane encryption key K2-Cenc and a control plane integrity key K2-Cint for a second slice based on the intermediate key Kan, and so on, and the first device may generate a control plane encryption key Kn-Cenc and a control plane integrity key Kn-Cint for the $n^{th}$ slice based on the intermediate key Kan.

Figure 11B:
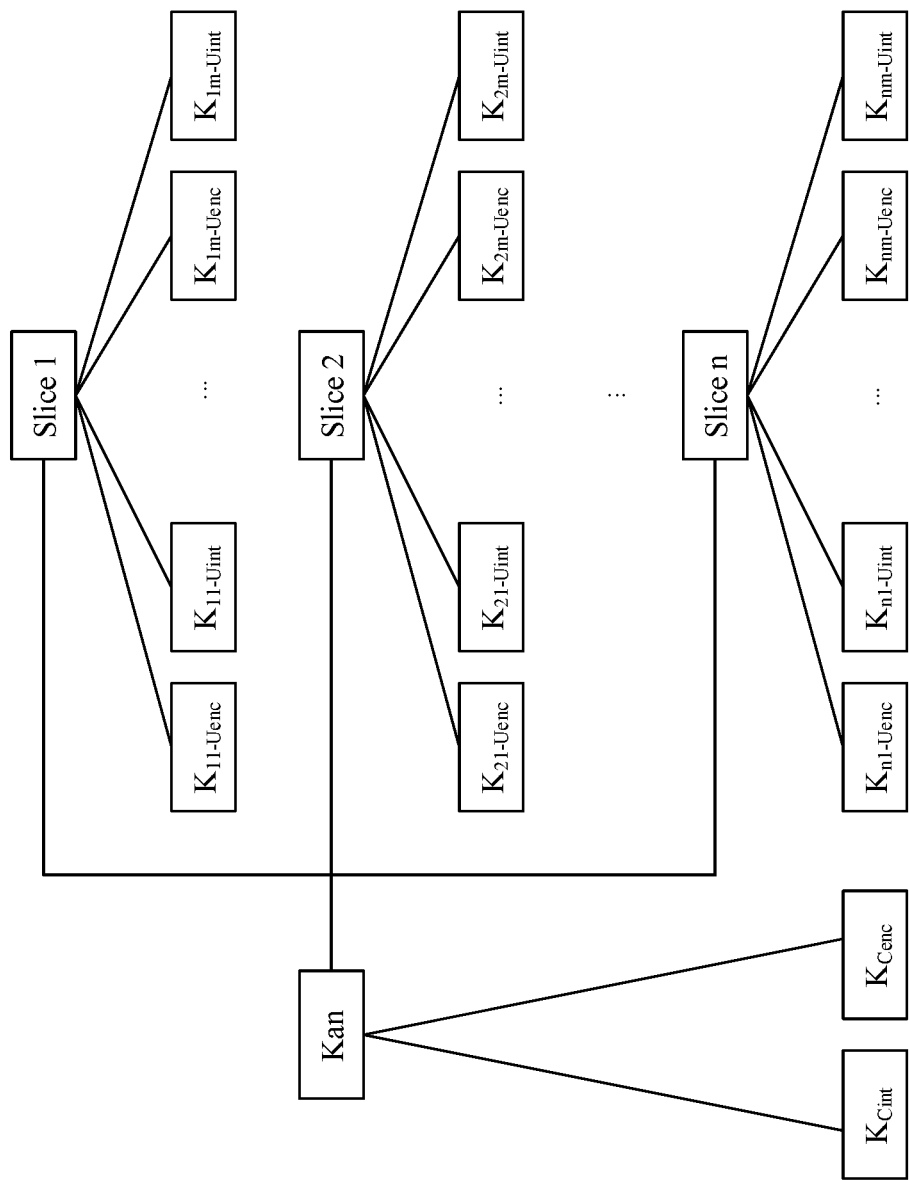

In a second implementation, as shown in FIG. 11B, assuming that an application scenario of this implementation includes slices S1 to Sn and each slice includes sessions H1 to Hm, a first device may generate a set of user plane keys for each session of each slice based on an intermediate key, and each set of user plane keys includes a user plane encryption key Kij-Uenc and a user plane integrity key Kij-Uint, where i indicates a serial number of the slice, and j indicates a serial number of the session in the slice. The first device may generate a set of control plane keys based on the intermediate key, and the set of control plane keys includes a control plane encryption key KCenc and a control plane integrity key KCint. The set of control plane keys is used to protect security of control plane data of the slices S1 to Sn. In other words, security of control plane data of each slice is protected by using same control plane keys. For example, the first device may generate a user plane encryption key K11-Uenc and a user plane integrity key K11-Uint for a first session of a first slice based on an intermediate key Kan, the first device may generate a user plane encryption key K12-Uenc and a user plane integrity key K12-Uint for a second session of the first slice based on the intermediate key Kan, and so on, and the first device may generate a user plane encryption key Knm-Uenc and a user plane integrity key Knm-Uint for an $m^{th}$ session of an $n^{th}$ slice based on the intermediate key Kan. The first device may generate a control plane encryption key KCenc and a control plane integrity key KCint based on the intermediate key Kan.

Figure 11C:
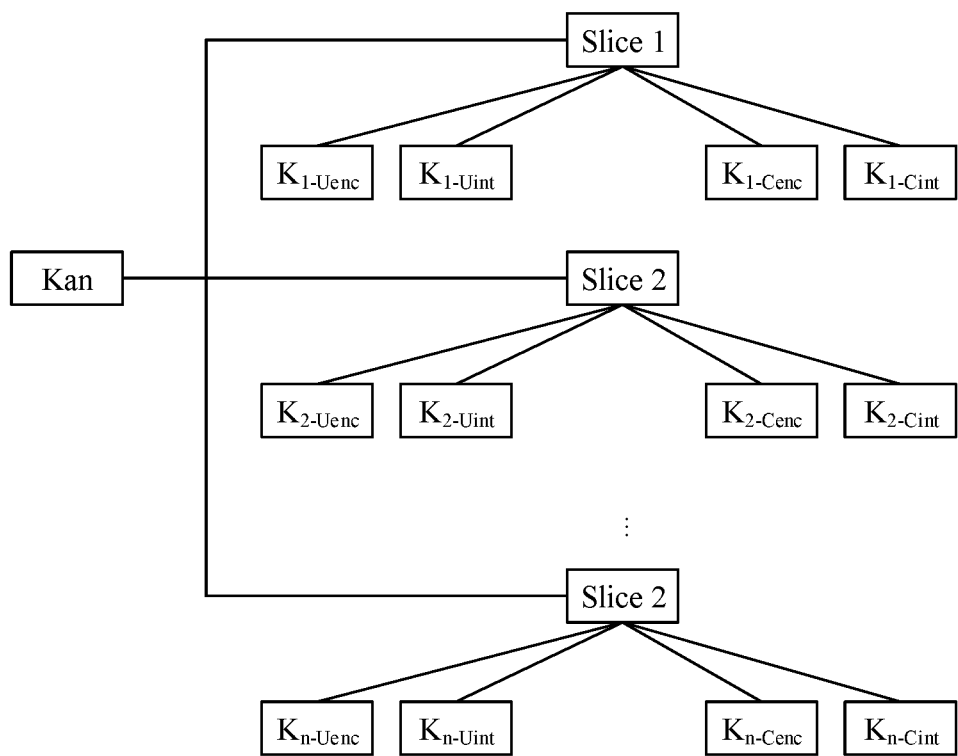

In a third implementation, as shown in FIG. 11C, assuming that an application scenario of this implementation includes slices S1 to Sn and each slice includes sessions H1 to Hm, a first device may generate a set of user plane keys for each slice based on an intermediate key, and each set of user plane keys includes a user plane encryption key Ki-Uenc and a user plane integrity key Ki-Uint, where i indicates a serial number of the slice. Each set of user plane keys is used to protect security of each session of the corresponding slice. In other words, security of sessions of a same slice is protected by using same user plane keys. The first device may generate a set of control plane keys for each slice based on the intermediate key, and each set of control plane keys includes a control plane encryption key Ki-Cenc and a control plane integrity key Ki-Uint, where i indicates the serial number of the slice. For example, the first device may generate a user plane encryption key K1-Uenc and a user plane integrity key K1-Uint for a first slice based on an intermediate key Kan, the first device may generate a user plane encryption key K2-Uenc and a user plane integrity key K2-Uint for a second slice based on the intermediate key Kan, and so on, and the first device may generate a user plane encryption key Kn-Uenc and a user plane integrity key Kn-Uint for an $n^{th}$ slice based on the intermediate key Kan. The first device may generate a control plane encryption key K1-Cenc and a control plane integrity key K1-Cint for the first slice based on the intermediate key Kan, the first device may generate a control plane encryption key K2-Cenc and a control plane integrity key K2-Cint for a second slice based on the intermediate key Kan, and so on, and the first device may generate a control plane encryption key Kn-Cenc and a control plane integrity key Kn-Cint for the $n^{th}$ slice based on the intermediate key Kan.

Figure 11D:
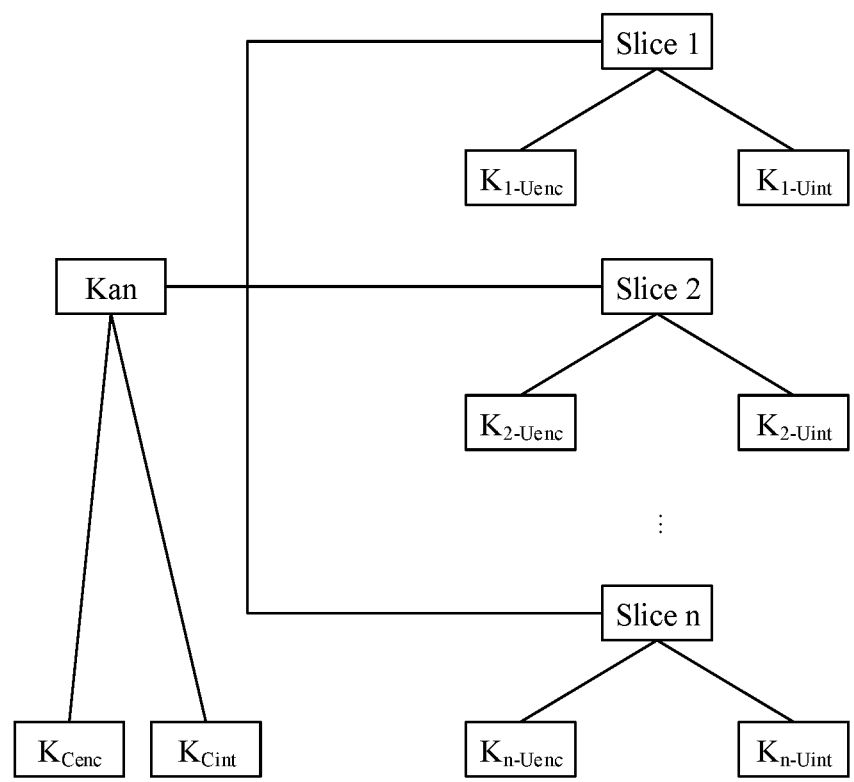

In a fourth implementation, as shown in FIG. 11D, assuming that an application scenario of this implementation includes slices S1 to Sn and each slice includes sessions H1 to Hm, a first device may generate a set of user plane keys for each slice based on an intermediate key, and each set of user plane keys includes a user plane encryption key Ki-Uenc and a user plane integrity key Ki-Uint, where i indicates a serial number of the slice. Each set of user plane keys is used to protect security of each session of the corresponding slice. In other words, security of sessions of a same slice is protected by using same user plane keys. The first device may generate a set of control plane keys based on the intermediate key, and the set of control plane keys includes a control plane encryption key KCenc and a control plane integrity key KCint. The set of control plane keys is used to protect security of control plane data of the slices S1 to Sn. In other words, security of control plane data of each slice is protected by using same control plane keys. For example, the first device may generate a user plane encryption key K1-Uenc and a user plane integrity key K1-Uint for a first slice based on an intermediate key Kan, the first device may generate a user plane encryption key K2-Uenc and a user plane integrity key K2-Uint for a second slice based on the intermediate key Kan, and so on, and the first device may generate a user plane encryption key Kn-Uenc and a user plane integrity key Kn-Uint for an $n^{th}$ slice based on the intermediate key Kan. The first device may generate a control plane encryption key KCenc and a control plane integrity key KCint based on the intermediate key Kan.

Figure 11E:
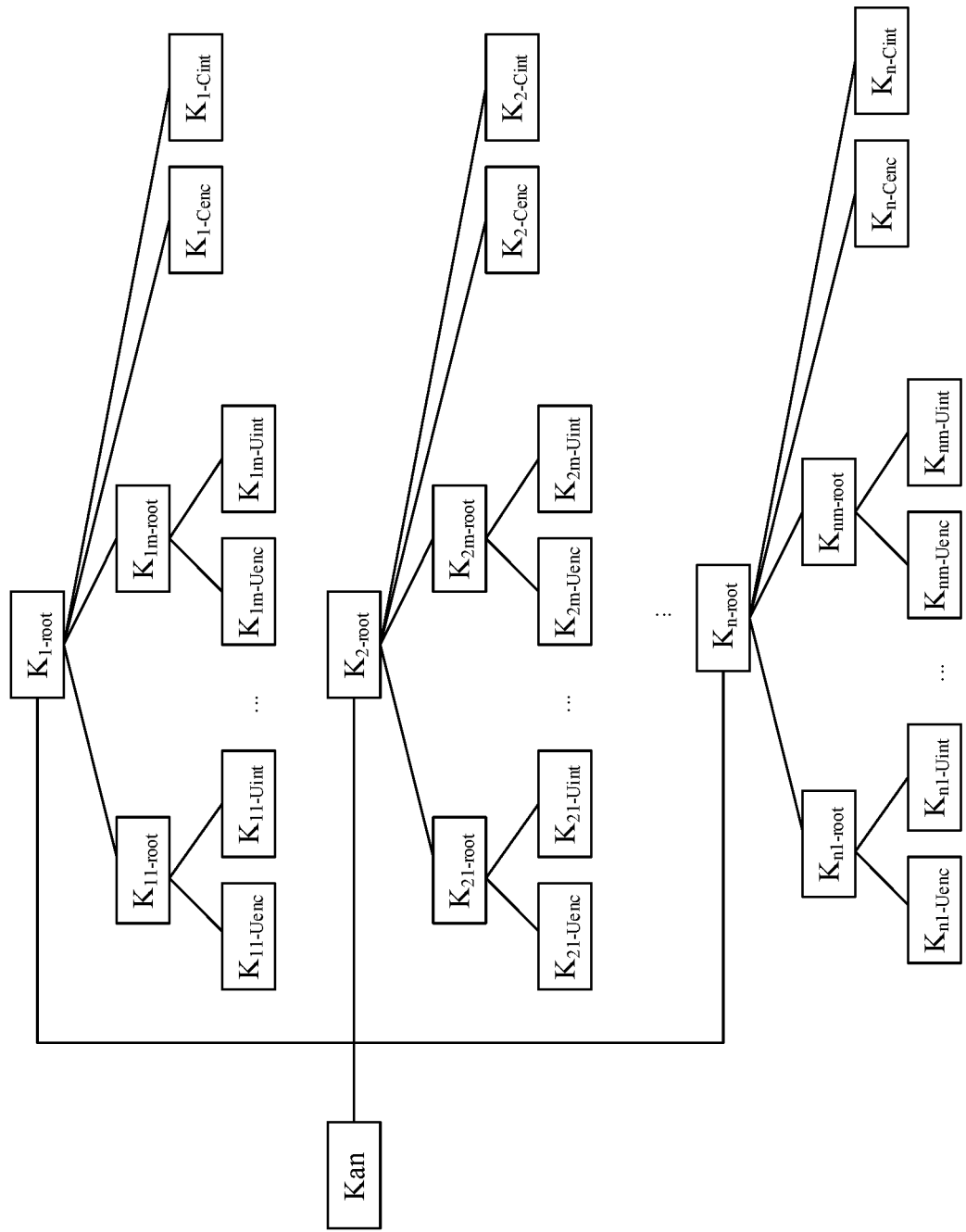

In a fifth implementation, as shown in FIG. 11E, assuming that an application scenario of this implementation includes slices S1 to Sn and each slice includes sessions H1 to Hm, a first device may generate a slice root key Ki-root for each slice based on an intermediate key, where i indicates a serial number of the slice. The first device generates a user plane key ij-root for each session of a slice i based on the root key Ki-root of the slice i, where i indicates the serial number of the slice, and j indicates a serial number of the session in the slice. Then, the first device generates a user plane encryption key Kij-Uenc and a user plane integrity key Kij-Uint for each session based on the user plane key ij-root of the session. The first device may generate a set of control plane keys for each slice based on the slice root key Ki-root, and each set of control plane keys includes a control plane encryption key Ki-Cenc and a control plane integrity key Ki-Uint, where i indicates the serial number of the slice. In other words, the user plane key ij-root of each session of each slice and the control plane keys of the slice are all generated based on the slice root key.

Figure 11F:
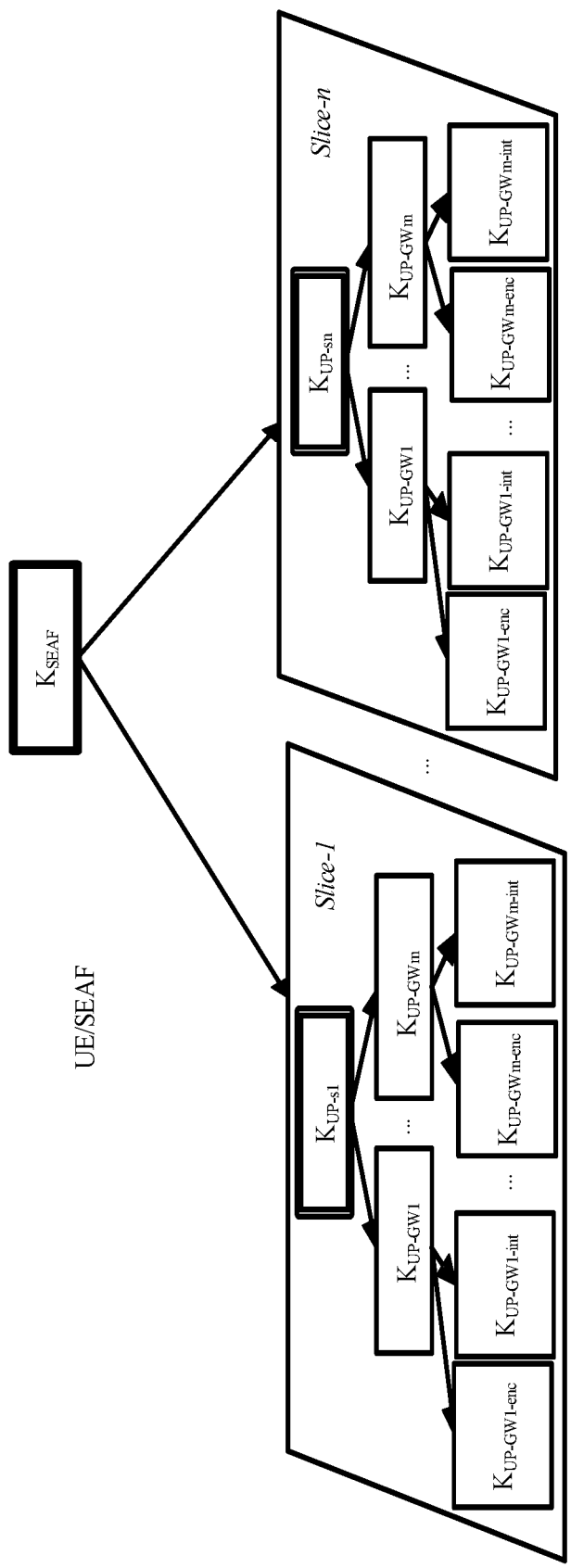

In a sixth implementation, as shown in FIG. 11F, this embodiment is mainly used to additionally describe a key generation method and procedure in a scenario in which there are a plurality of slices and a plurality of sessions (in a slice). A core idea of this embodiment is deriving, by K_SEAF, session root keys for different slices, and further deriving session keys corresponding to a UP-GW that is an encryption termination point. An architecture of the generated keys is shown in FIG. 11F, where "sn" is used to identify an $n^{th}$ slice, and "UP-GWm" is used to identify an $m^{th}$ session in a slice. For simplicity, it is assumed that each slice has a same quantity (m) of sessions. Actually, different slices may have different quantities of sessions.

Figure 12:
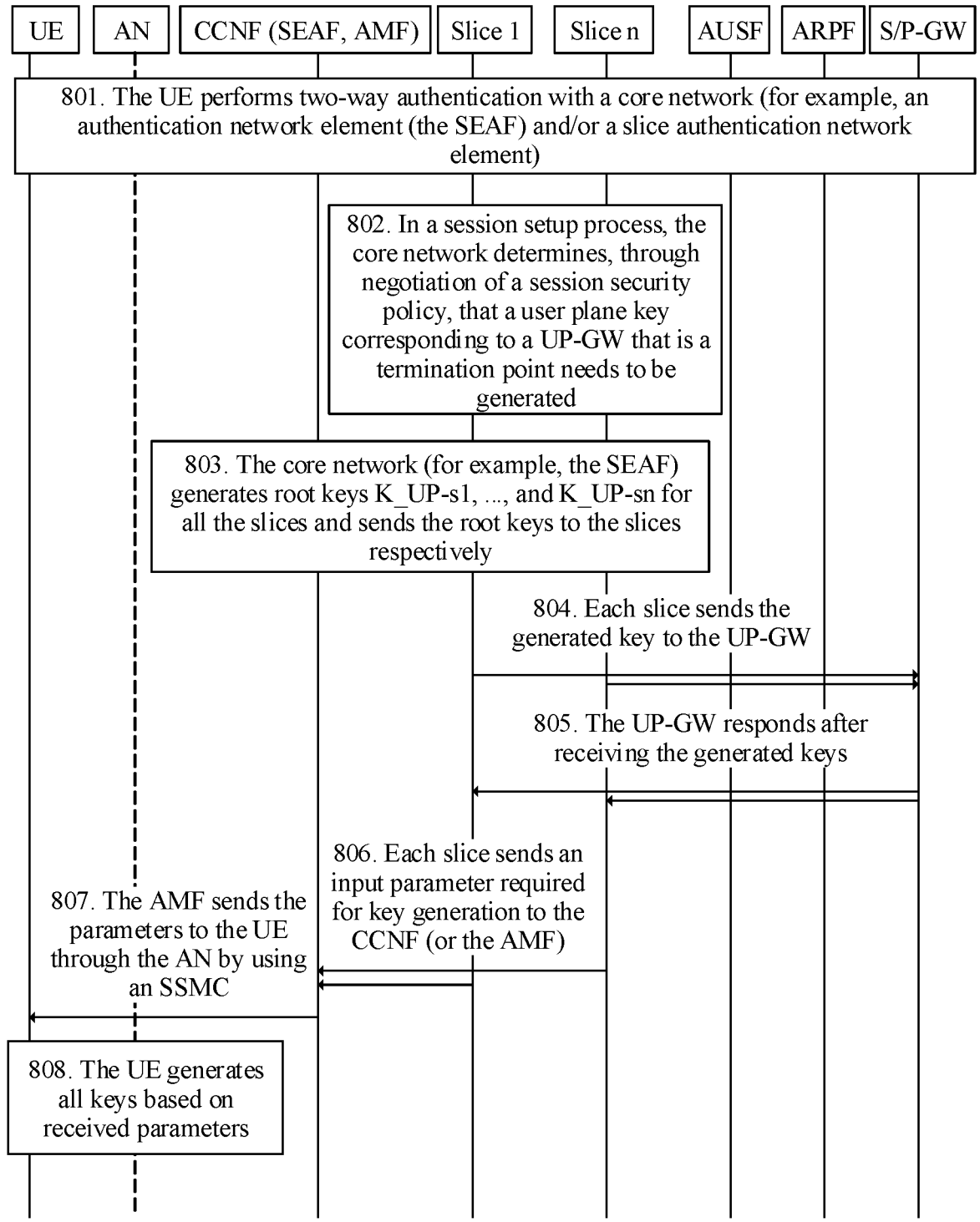
FIG. 12 is a schematic flowchart of key generation and distribution performed by a first device according to an embodiment of this application.

As shown in FIG. 12, operations of generation and distribution of the keys in FIG. 11F are as follows.

801. UE performs two-way authentication with a core network (for example, an authentication network element (an SEAF) and/or a slice authentication network element), and generates a root key K_SEAF. The core network determines slices for the UE, and IDs of the slices may be indicated as Slc-ID1, . . . , and Slc-IDN.

802. In a session setup process, the core network determines, through negotiation of a session security policy, that a user plane key corresponding to a termination point at a user plane gateway (UP-GW) needs to be generated.

803. The core network (for example, the SEAF) generates root keys K_UP-s1, . . . , and K_UP-sn for the slices and sends the root keys to the slices respectively (sends only the key corresponding to each slice, for example, sends K_UP-sn to a slice n). Based on the slice root key, each slice derives all session keys (for example, a key for an $m^{th}$ session of an $n^{th}$ slice is KUP-Sn-GWm (-enc, -int), where "enc" represents an encryption and decryption key, and "int" represents an integrity protection key). Generation functions for the encryption and decryption key and the integrity protection key are KDF(UP-GW-enc-alg, Bearerm, SliceIDn . . . ) and KDF(UP-GW-int-alg, Bearerm, SliceIDn . . . ) respectively, where KDF represents a key generation function, Bearerm and SliceIDn represent a bearer ID and a slice ID respectively and serve as input parameters of the KDF, and other input parameters include UP-GW-enc-alg and UP-GW-int-alg that represent algorithms used for encryption and integrity protection respectively.

804. Each slice sends the generated key to the UP-GW.

805. The UP-GW responds after receiving the generated keys.

806. Each slice sends input parameters required for key generation to a CCNF (or an AMF).

807. The AMF sends the parameters to the UE through an access network (AN) by using an SSMC.

808. The UE generates all keys based on received parameters (in a way similar to the generation method in operation 803).

Figure 13A:
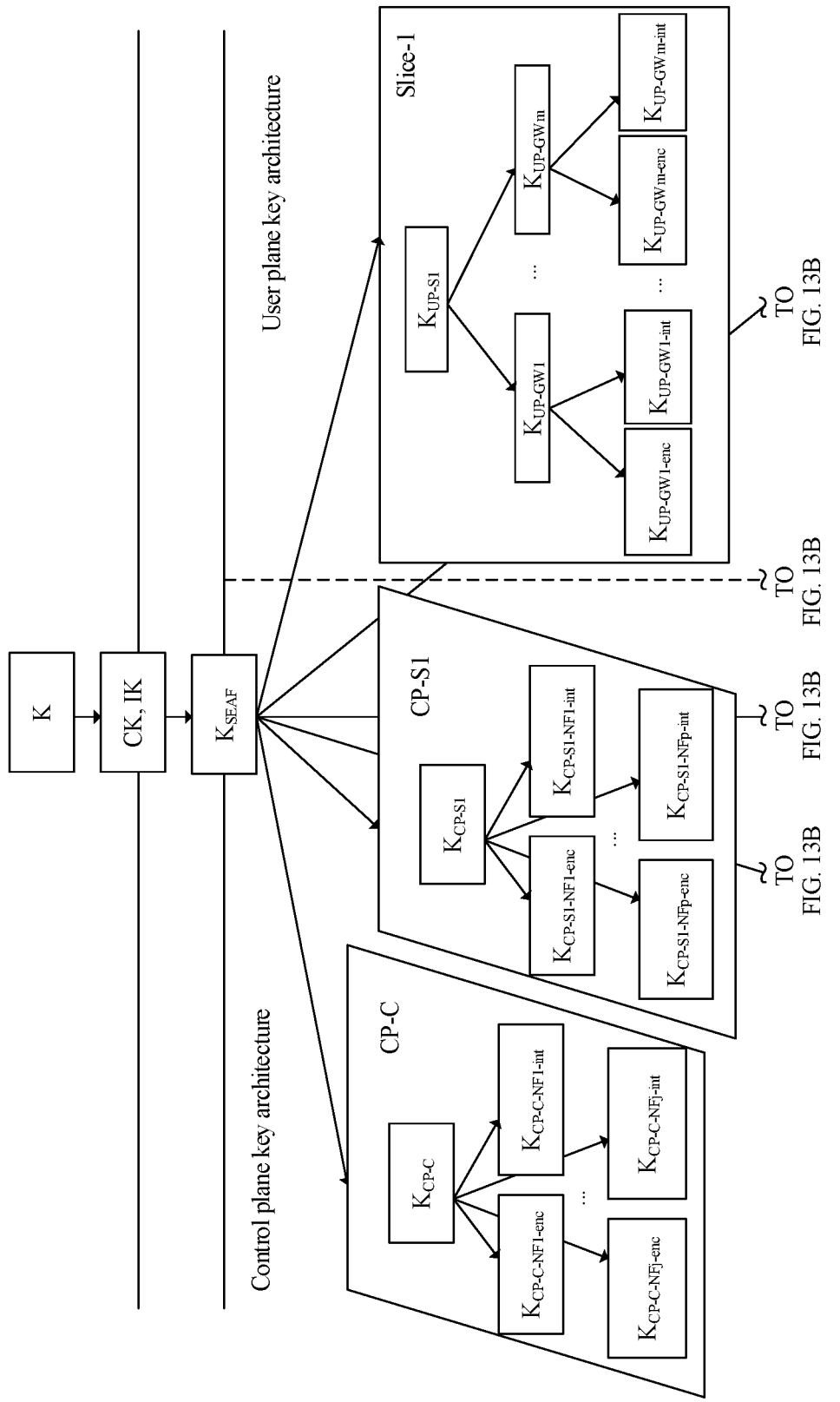
FIG. 13A and FIG. 13B are a schematic diagram of an overall key architecture according to an embodiment of this application.
Figure 13B:
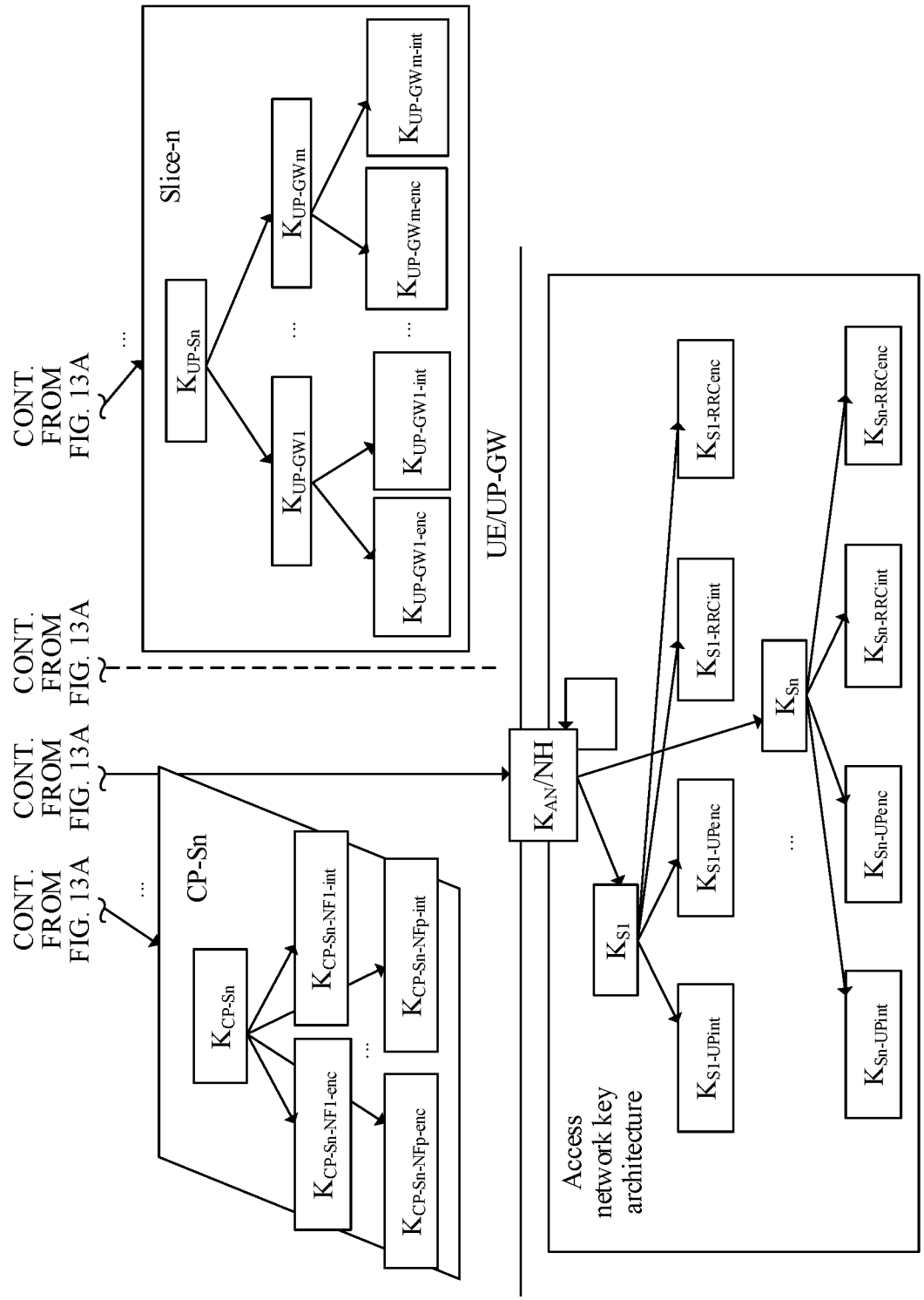

FIG. 13A and FIG. 13B are a schematic diagram of an overall key architecture according to an embodiment of this application. A control plane key architecture of a core network is similar to that in the embodiment of FIG. 9, a user plane key architecture of a core network is similar to that in the embodiment of FIG. 11F, and a key architecture of an access network is similar to that in the embodiments of FIG. 11A to FIG. 11E. Details are not described herein again.

It may be understood that for ease of description, the foregoing example is described by assuming that each slice has a same quantity of sessions. In actual application, slices may have different quantities of sessions, or at least two slices have a same quantity of sessions. This is not limited in this application.

In the several embodiments provided in this application, it is understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the operations of the methods described in the embodiments of this application. The foregoing storage medium includes: any medium that can store program code, such as a universal serial bus (USB) flash drive, a removable hard disk, a read-only memory (ROM), a random access memory (RAM), a magnetic disk, or an optical disc.

All or some of the foregoing embodiments may be implemented by software, hardware, firmware, or any combination thereof. When software is used to implement the embodiments, the embodiments may be implemented fully or partially in a form of a computer program product.

The computer program product includes one or more computer instructions. When the computer program instructions are loaded and executed on the computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disk (DVD)), a semiconductor medium (for example, a solid state disk (SSD)), or the like.

The invention claimed is:

1. A key processing method, comprising:
obtaining, by a security anchor network element, a first key parameter, wherein the first key parameter comprises identifier information of N network slices which are to be accessed by a user equipment;
generating, by the security anchor network element, N slice-dedicated keys based on the first key parameter;
sending, by the security anchor network element, the N slice-dedicated keys to the corresponding N network slices respectively; and
sending, by the security anchor network element, the first key parameter to an access and mobility management network element, which further sends the first key parameter to the user equipment.

2. The key processing method of claim 1, wherein the user equipment is to generate the same N slice-dedicated keys for the N network slices based on the first key parameter, and to access the N network slices based on the generated N slice-dedicated keys.

3. The key processing method of claim 1, further comprising:
generating, by the security anchor network element, a shared key based on a second key parameter; and
sending, by the security anchor network element, the second key parameter and the shared key to the access and mobility management network element.

4. The key processing method of claim 3, wherein the access and mobility management network element is to encrypt the first key parameter by using the shared key before sending the first key parameter to the user equipment, and to send the encrypted first key parameter to the user equipment.

5. The key processing method of claim 4, wherein the user equipment is to receive the second key parameter from the access and mobility management network element, and to generate the same shared key based on the second key parameter.

6. The key processing method of claim 5, wherein the user equipment is to receive the encrypted first key parameter from the access and mobility management network element, to obtain the first key parameter from the encrypted first key parameter by using the shared key, to generate the same N slice-dedicated keys for the N network slices based on the first key parameter, and to access the N network slices based on the generated N slice-dedicated keys.

7. The key processing method of claim 3, wherein the second key parameter includes a key algorithm type distinguisher or a key algorithm ID.

8. The key processing method of claim 1, wherein the access and mobility management network element is to receive the first key parameter from the security anchor network element.

9. A key processing system, comprising:
a security anchor network element; and
an access and mobility management network element;
wherein the security anchor network element is configured to:
obtain a first key parameter, wherein the first key parameter comprises identifier information of N network slices which are to be accessed by a user equipment;
generate N slice-dedicated keys based on the first key parameter;
send the N slice-dedicated keys to the corresponding N network slices respectively;
wherein the access and mobility management network element is configured to:
obtain the first key parameter, and
send the first key parameter to the user equipment.

10. The system according to claim 9, wherein the system further comprises the user equipment;
wherein the user equipment is configured to:
generate the same N slice-dedicated keys for the N network slices based on the first key parameter, and
access the N network slices based on the generated N slice-dedicated keys.

11. The system according to claim 9, wherein the security anchor network element is further configured to:
generate a shared key based on a second key parameter; and
send the second key parameter and the shared key to the access and mobility management network element; and
wherein the access and mobility management network element is further configured to send the second key parameter to the user equipment.

12. The system according to claim 11, wherein the access and mobility management network element is further configured to:
encrypt the first key parameter by using the shared key before sending the first key parameter to the user equipment; and
send the encrypted first key parameter to the user equipment.

13. The system according to claim 12, wherein the user equipment is further configured to:
receive the second key parameter from the access and mobility management network element; and
generate the same shared key based on the second key parameter.

14. The system according to claim 12, wherein the user equipment is further configured to:
receive the encrypted first key parameter from the access and mobility management network element; and
obtain, by using the shared key, the first key parameter from the encrypted first key parameter;
generate the same N slice-dedicated keys for the N network slices based on the first key parameter, and
access the N network slices based on the generated N slice-dedicated keys.

15. The system according to claim 12, wherein the access and mobility management network element is configured to receive the first key parameter from the security anchor network element.

16. A key processing method, comprising:
receiving, by an apparatus, a first key parameter from an access and mobility management network element, wherein the first key parameter comprises identifier information of N network slices; and
generating, by the apparatus based on the first key parameter, N slice-dedicated keys for accessing the N network slices.

17. The key processing method of claim 16, further comprising:
receiving, by the apparatus, a second key parameter from the access and mobility management network element; and
generating, by the apparatus based on the second key parameter, a shared key for accessing a shared network function of the N network slices.

18. The key processing method of claim 17, wherein the second key parameter includes a key algorithm type distinguisher or a key algorithm ID.

19. The key processing method of claim 17, wherein the receiving the first key parameter comprises:
receiving an encrypted first key parameter from the access and mobility management network element; and
obtaining, by using the shared key, the first key parameter from the encrypted first key parameter.

20. The key processing method of claim 16, further comprising:
accessing, by the apparatus, the N network slices based on the generated N slice-dedicated keys.

21. A communications apparatus, comprising at least one processor coupled to at least one memory storing instructions and configured to execute the instructions to cause the apparatus to:
obtain a first key parameter, wherein the first key parameter comprises identifier information of N network slices which are to be accessed by a user equipment;
generate N slice-dedicated keys based on the first key parameter;
send the N slice-dedicated keys to the corresponding N network slices respectively; and
send the first key parameter to an access and mobility management network element, which further sends the first key parameter to the user equipment.

22. The apparatus according to claim 21, wherein the instructions further cause the apparatus to:
generate a shared key based on a second key parameter;
send the second key parameter and the shared key to the access and mobility management network element.

23. The apparatus according to claim 22, wherein the second key parameter includes a key algorithm type distinguisher or a key algorithm ID.

24. A communications apparatus, comprising at least one processor coupled to at least one memory storing instructions and configured to execute the instructions to cause the apparatus to:
receive a first key parameter from an access and mobility management network element, wherein the first key parameter comprises identifier information of N network slices; and
generate, based on the first key parameter, N slice-dedicated keys for accessing the N network slices.

25. The apparatus according to claim 24, wherein the instructions further cause the apparatus to:
receive a second key parameter from the access and mobility management network element; and
generate, based on the second key parameter, a shared key for accessing a shared network function of the N network slices.

26. The apparatus according to claim 25, wherein the second key parameter includes a key algorithm type distinguisher or a key algorithm ID.

27. The apparatus according to claim 25, wherein the instructions cause the apparatus to receive the first key parameter by:
receiving an encrypted first key parameter from the access and mobility management network element; and
obtaining, by using the shared key, the first key parameter from the encrypted first key parameter.

28. The apparatus according to claim 25, wherein the instructions further cause the apparatus to access the N network slices based on the generated N slice-dedicated keys.

* * * * *